US011143632B2

(12) United States Patent
Araki et al.

(10) Patent No.: US 11,143,632 B2
(45) Date of Patent: Oct. 12, 2021

(54) ROTATING MACHINE ABNORMALITY DETECTION DEVICE AND METHOD, AND ROTATING MACHINE

(71) Applicant: KABUSHIKI KAISHA KOBE SEIKO SHO (Kobe Steel, Ltd.), Hyogo (JP)

(72) Inventors: Kaname Araki, Kobe (JP); Eiji Takahashi, Kobe (JP); Shugo Takaki, Takasago (JP); Masato Hayashi, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 273 days.

(21) Appl. No.: 16/325,192

(22) PCT Filed: Aug. 28, 2017

(86) PCT No.: PCT/JP2017/030772
§ 371 (c)(1),
(2) Date: Feb. 13, 2019

(87) PCT Pub. No.: WO2018/066267
PCT Pub. Date: Apr. 12, 2018

(65) Prior Publication Data
US 2019/0170704 A1    Jun. 6, 2019

(30) Foreign Application Priority Data
Oct. 6, 2016 (JP) .............................. JP2016-197684

(51) Int. Cl.
*G01N 29/46* (2006.01)
*G01N 29/14* (2006.01)
(Continued)

(52) U.S. Cl.
CPC ............. *G01N 29/46* (2013.01); *G01H 17/00* (2013.01); *G01M 99/00* (2013.01); *G01N 29/14* (2013.01); *G01N 29/4472* (2013.01)

(58) Field of Classification Search
CPC .... G01N 29/46; G01N 29/4472; G01N 29/14; G01M 99/00; G01M 13/028; G01H 17/00
See application file for complete search history.

(56) References Cited

U.S. PATENT DOCUMENTS

| 4,429,578 A | 2/1984 | Darrel et al. |
| 2002/0111774 A1 | 8/2002 | Kauppila |
(Continued)

FOREIGN PATENT DOCUMENTS

| CN | 105738806 A | 7/2016 |
| JP | H05-231361 A | 9/1993 |
(Continued)

*Primary Examiner* — Stephanie E Bloss
(74) *Attorney, Agent, or Firm* — Studebaker & Brackett PC

(57) ABSTRACT

In a rotating machine abnormality detection device, a rotating machine abnormality detection method, and a rotating machine according to the present invention, vibration caused by at least one of first and second rotating bodies is measured, a predetermined feature amount related to a frequency component is obtained based on a frequency spectrum of the measurement data, and determination is made on presence/absence of abnormality based on the obtained predetermined feature amount. On this occasion, when determination is made that abnormality is present, determination whether the determination of abnormality is caused by noise or not is made based on the frequency spectrum, and when determination is made that the determination of abnormality is not caused by the noise, the determined abnormality is ultimately considered as abnormality.

12 Claims, 16 Drawing Sheets

(51) Int. Cl.
    *G01M 99/00*  (2011.01)
    *G01H 17/00*  (2006.01)
    *G01N 29/44*  (2006.01)

(56) References Cited

U.S. PATENT DOCUMENTS

| | | | | |
|---|---|---|---|---|
| 2007/0260656 | A1* | 11/2007 | Wiig | G01M 13/028 |
| | | | | 708/200 |
| 2009/0093975 | A1* | 4/2009 | Judd | G01H 13/00 |
| | | | | 702/34 |
| 2015/0233792 | A1* | 8/2015 | Gao | G01M 99/005 |
| | | | | 702/35 |
| 2016/0018519 | A1* | 1/2016 | Brand | G01N 29/12 |
| | | | | 367/7 |
| 2017/0067860 | A1* | 3/2017 | Grabill | G01M 7/00 |
| 2017/0184445 | A1 | 6/2017 | Araki et al. | |
| 2017/0205276 | A1 | 7/2017 | Araki et al. | |
| 2017/0205316 | A1* | 7/2017 | Araki | F04C 18/16 |
| 2017/0219420 | A1* | 8/2017 | Takahashi | G01H 17/00 |
| 2017/0223195 | A1* | 8/2017 | Miyamori | H04N 1/00015 |
| 2019/0033263 | A1* | 1/2019 | Giurgiutiu | G01N 29/46 |
| 2019/0226943 | A1* | 7/2019 | Hayashi | F03D 17/00 |

FOREIGN PATENT DOCUMENTS

| | | |
|---|---|---|
| JP | H09-133577 A | 5/1997 |
| JP | 2005-241089 A | 9/2005 |

* cited by examiner

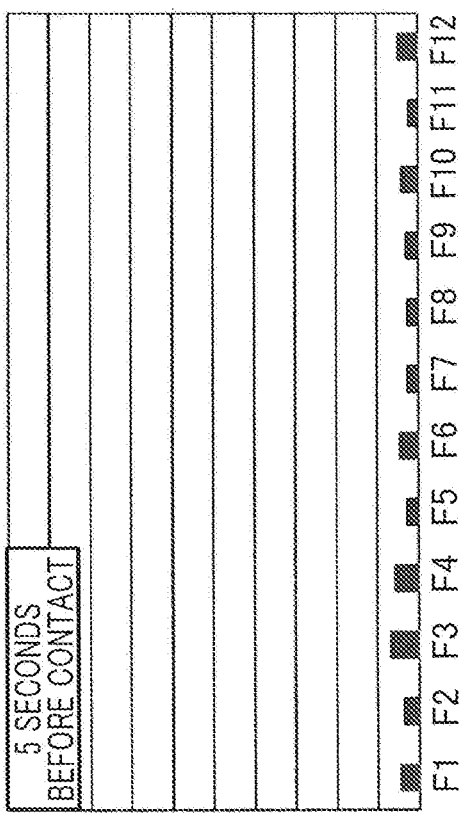
FIG.12A
FIG.12B
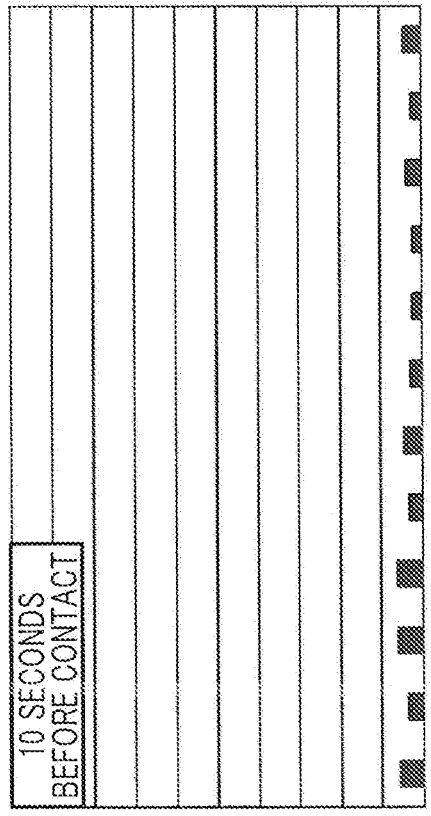
FIG.12C
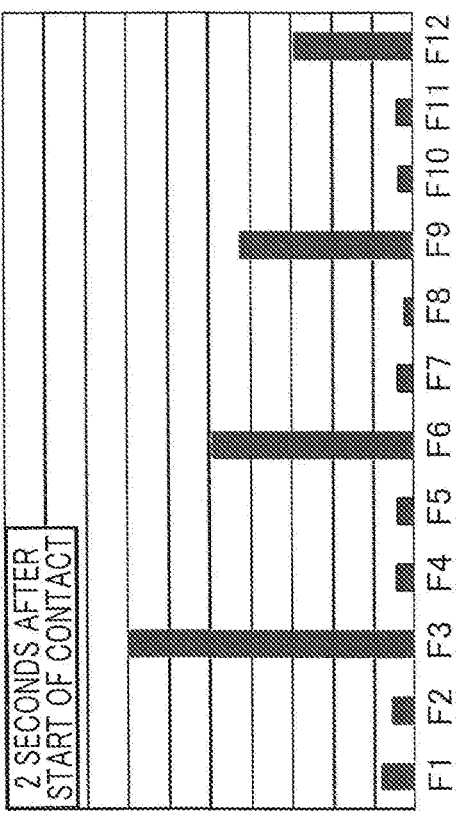
FIG.12D
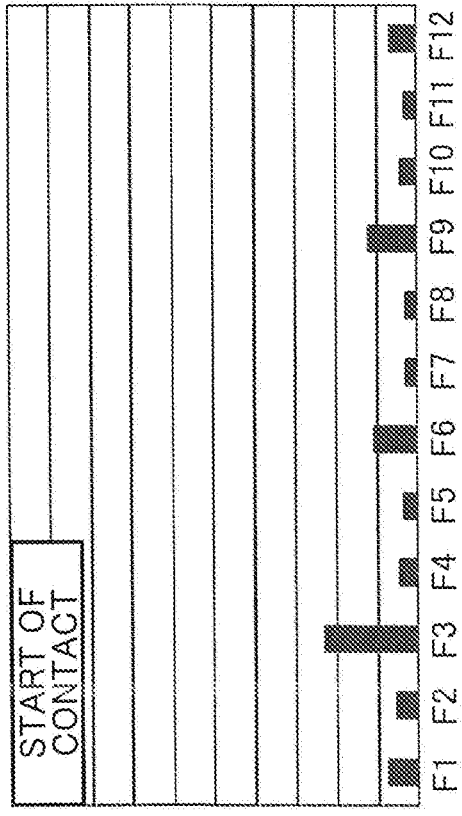

FIG.14

| CONTACT MODEL | a1 | a2 | a3 | a4 | a5 | a6 | a7 | a8 | a9 | a10 | a11 | a12 |
|---|---|---|---|---|---|---|---|---|---|---|---|---|
| 1 MESH CONTACT OUT OF 12 MESHES | 0.214 | 0.171 | 0.137 | 0.110 | 0.088 | 0.070 | 0.056 | 0.045 | 0.036 | 0.029 | 0.023 | 0.018 |
| 2 MESHES CONTACT OUT OF 12 MESHES | | 0.271 | | 0.217 | | 0.173 | | 0.139 | | 0.111 | | 0.089 |
| 3 MESHES CONTACT OUT OF 12 MESHES | | | 0.339 | | | 0.271 | | | 0.217 | | | 0.174 |
| 4 MESHES CONTACT OUT OF 12 MESHES | | | | 0.410 | | | | 0.328 | | | | 0.262 |
| 6 MESHES CONTACT OUT OF 12 MESHES | | | | | | 0.555 | | | | | | 0.444 |
| 12 MESHES CONTACT OUT OF 12 MESHES | | | | | | | | | | | | 1.000 |

ROTATING MACHINE ABNORMALITY DETECTION DEVICE AND METHOD, AND ROTATING MACHINE

TECHNICAL FIELD

The present invention relates to a rotating machine abnormality detection device and rotating machine abnormality detection method for detecting abnormality of a rotating machine, and a rotating machine equipped with the rotating machine abnormality detection device.

BACKGROUND ART

For example, a rotating machine such as an electric motor, a power generator, a compressor, and a pump is equipped with a rotating body which rotates around a predetermined shaft Such a rotating machine is used in various plants, and abnormality of the rotating machine is detected for ensuring a normal operation state of the rotating machine. For detecting such abnormality, there are provided, for example, an analysis device disclosed in Patent Literature 1 and a device for detecting abnormal contact disclosed in Patent Literature 2.

In a case where abnormality of a rotating machine is detected based on output of a sensor, when noise is mixed with output of the sensor, erroneous detection might be made. In a case of noise being superimposed on output of the sensor all the time, since a feature of the noise is identified by examination thereof filtering of the output of the sensor by a filter according to the identified feature of the noise enables removal of the noise. However, noise generated at time when no abnormality occurs is not always reproducible, and a feature thereof is hard to be gasped, so that it is difficult to remove such noise. As a result, erroneous detection might be made.

CITATION LIST

Patent Literature

Patent Literature 1: Unexamined Japanese Patent Publication No. H5-231361
Patent Literature 2: Unexamined Japanese Patent Publication No. H9-133577

SUMMARY OF INVENTION

An object of the present invention, which is an invention made in view of the abovedescribed circumstances, is to provide a rotating machine abnormality detection device and rotating machine abnormality detection method for determining abnormality of a rotating machine with higher reliability, and a rotating machine equipped with the rotating machine abnormality detection device.

In a rotating machine abnormality detection device, a rotating machine abnormality detection method, and a rotating machine according to the present invention, vibration caused by at least one of first and second rotating bodies is measured, a predetermined feature amount related to a frequency component is obtained based on a frequency spectrum of the measurement data, and determination is made on presence/absence of abnormality based on the obtained predetermined feature amount. On this occasion, when determination is made that abnormality is present, determination whether the determination of abnormality is caused by noise or not is made based on the frequency spectrum, and when determination is made that the determination of abnormality is not caused by the noise, the determined abnormality is ultimately considered as abnormality. Accordingly, the rotating machine abnormality detection device and the rotating machine abnormality detection method according to the present invention enable determination of abnormality with higher reliability. According to the present invention, a rotating machine equipped with such a rotating machine abnormality detection device can be provided.

The above and other objects, features and advantages of the present invention will become apparent from the following detailed description and accompanying drawings.

BRIEF DESCRIPTION OF DRAWINGS

FIG. 12 is a diagram showing a temporal change of a frequency spectrum before and after the occurrence of abnormality.

FIG. 14 is a diagram showing one example of model information related to a feature amount of a fourth mode.

DESCRIPTION OF EMBODIMENTS

Figure 1:
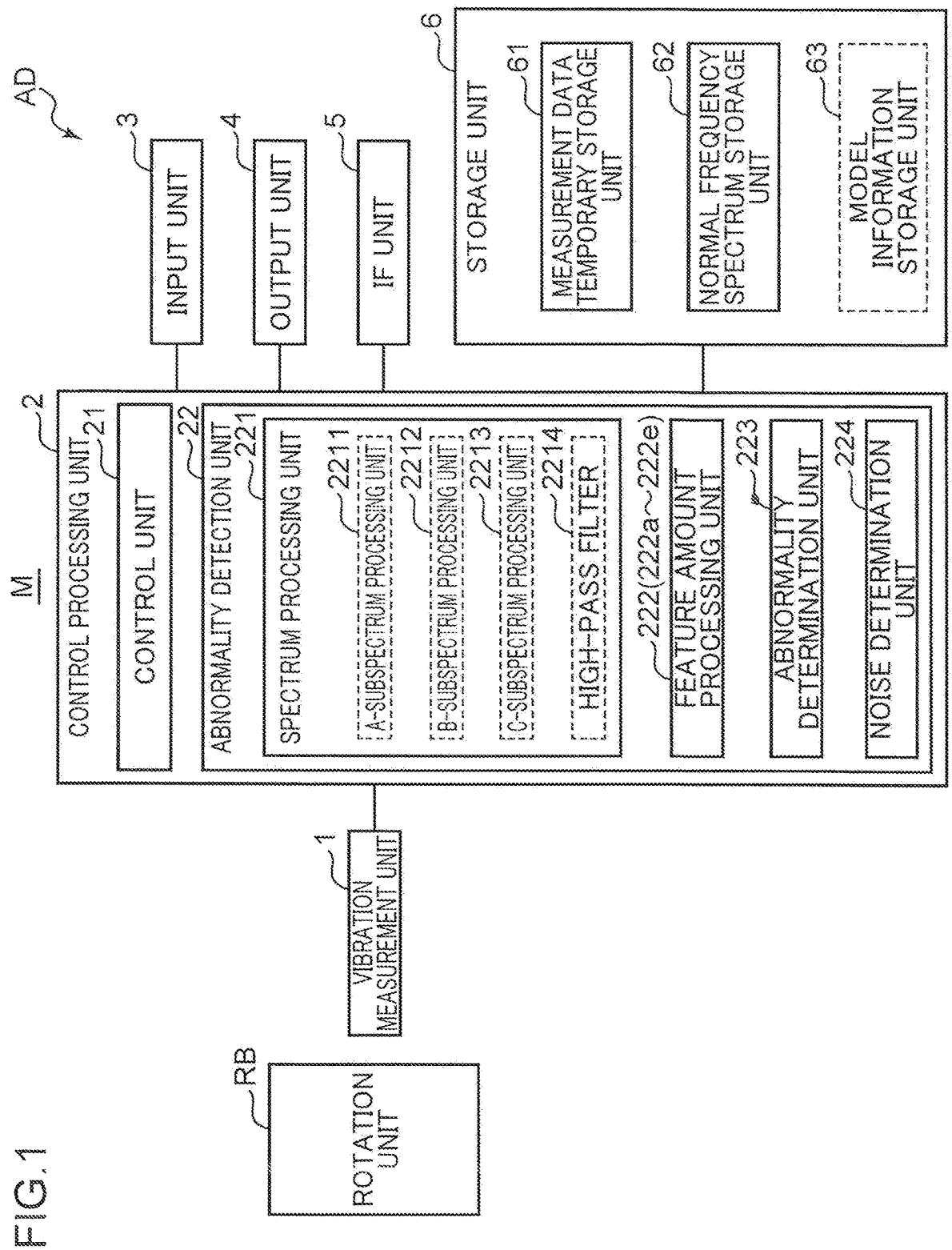
FIG. 1 is a block diagram showing a configuration of a rotating machine according to an embodiment and a rotating machine abnormality detection device provided in the rotating machine.

In the following, one embodiment according to the present invention will be described based on the drawings. The configuration to which the same reference numeral is applied represents the same configuration, description of which is appropriately omitted. In the present specification, a generic configuration is denoted by a reference numeral with a suffix omitted and an individual configuration is denoted by a reference numeral with a suffix.

Figure 2:
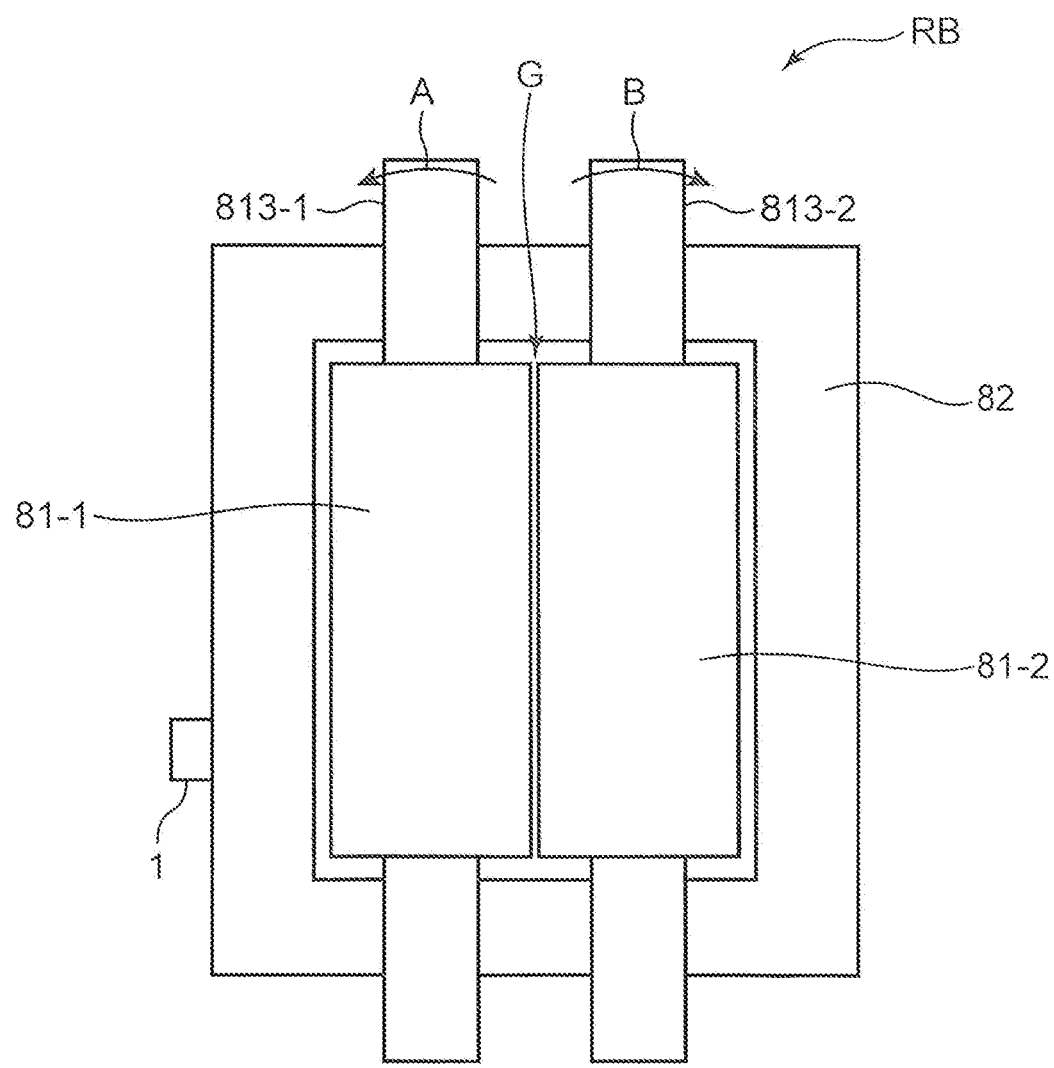
FIG. 2 is a schematic view of an upper face of a rotating body as one example in the rotating machine shown in FIG. 1.
Figure 3:
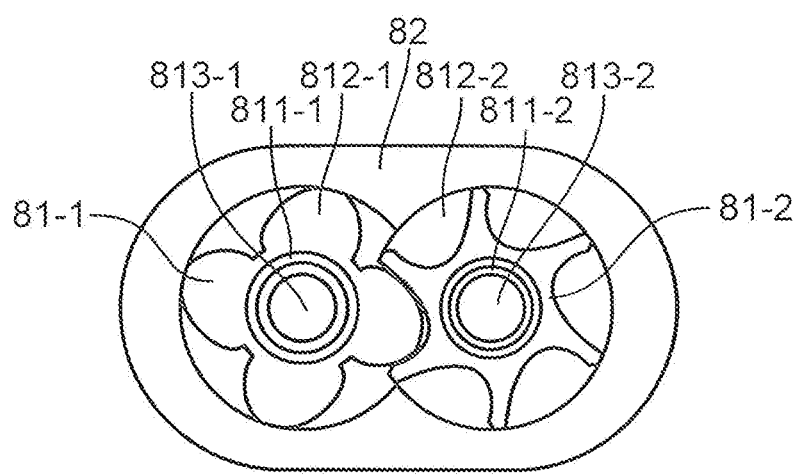
FIG. 3 is a schematic sectional view of the rotating body shown in FIG. 2.
Figure 4A:
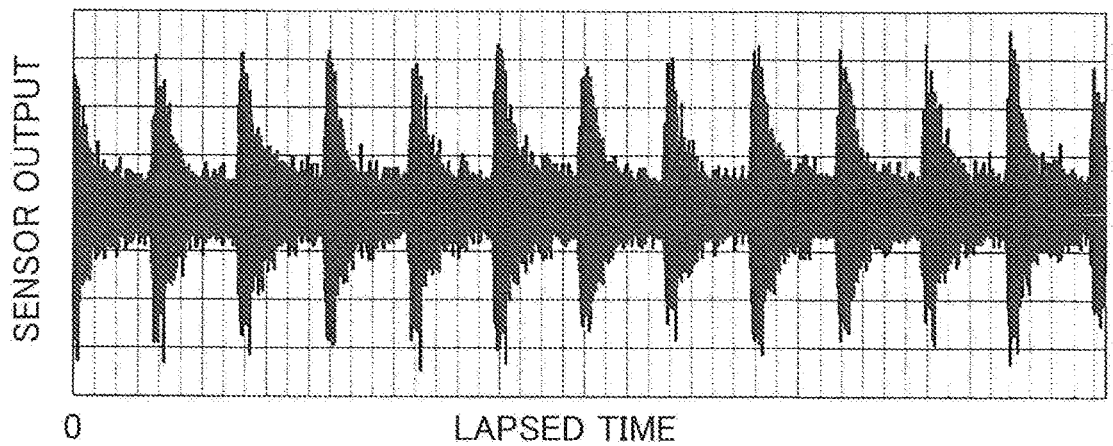
FIG. 4 is a diagram for explaining spectrum process with relatively low background noise.
Figure 4B:
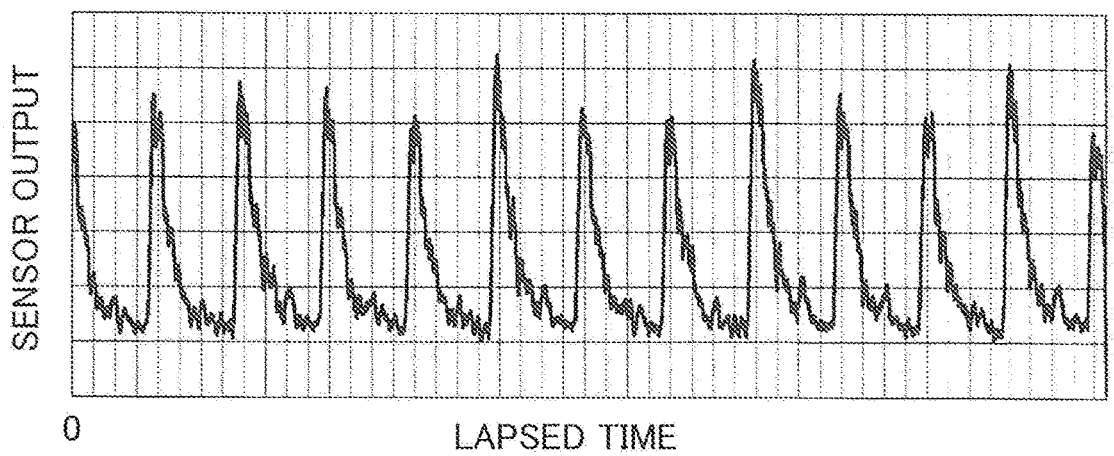
Figure 4C:
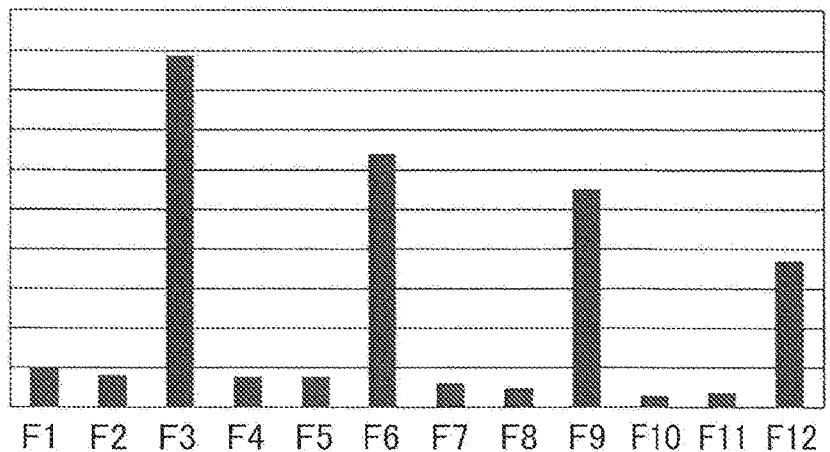
Figure 5A:
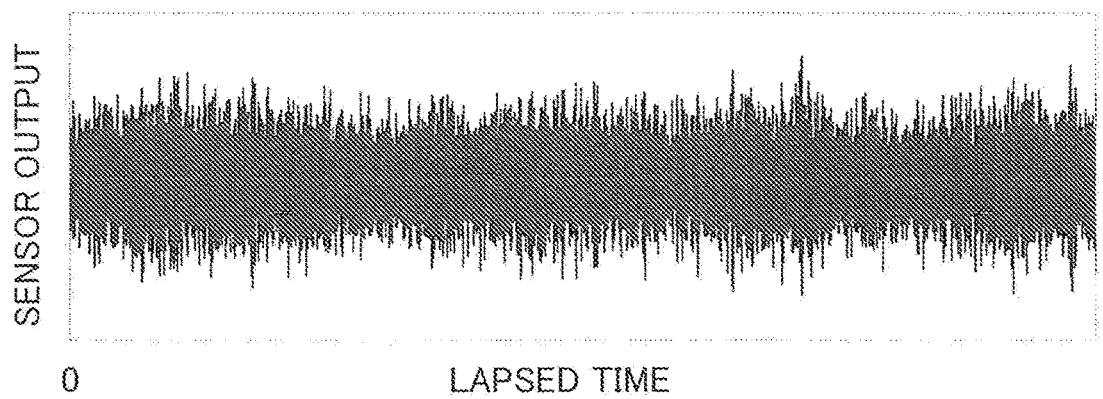
FIG. 5 is a diagram for explaining spectrum process with relatively high background noise.
Figure 5B:
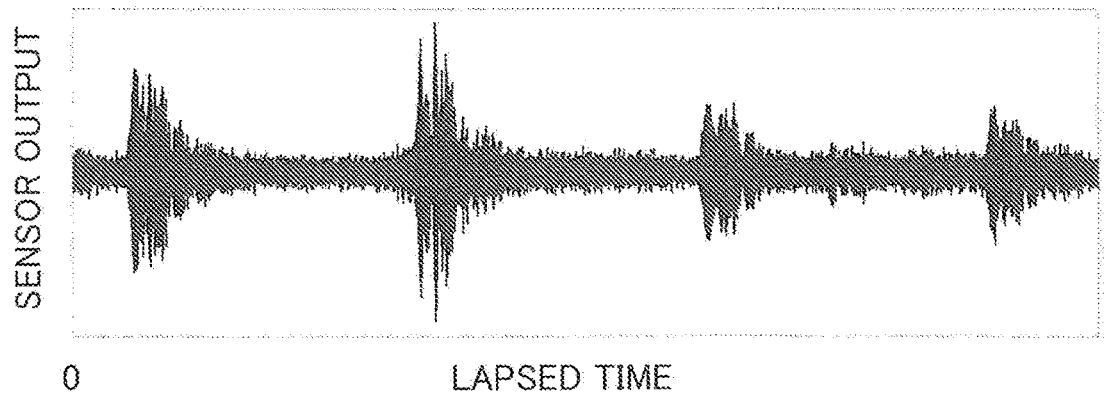

FIG. 1 is a block diagram showing a configuration of a rotating machine according to the embodiment and a rotating machine abnormality detection device provided in the rotating machine. FIG. 2 is a schematic view of an upper face of a rotating body as one example in the rotating machine shown in FIG. FIG. 3 is a schematic sectional view of the rotating body shown in FIG. 2. FIG. 4 is a diagram for explaining spectrum process with relatively low background noise. FIG. 4A shows measurement data measured by an AE sensor, FIG. 4B shows RMS of the measurement data, and FIG. 4C shows frequency spectra of the measurement data. In FIG. 4A, a horizontal axis represents time (time elapsed from start of measurement) and a vertical axis represents an output level of a sensor output. In FIG. 4B, a horizontal axis represents time (time elapsed from start of measurement) and a vertical axis represents an RMS value. In FIG. 4C, a horizontal axis represents a frequency and a vertical axis represents a component value. FIG. 5 is a diagram for explaining spectrum process with relatively high background noise. FIG. 5A shows measurement data measured by the AE sensor, FIG. 5B shows measurement data after transmission through a high-pass filter. In FIGS. 5A and 5B, each horizontal axis represents time (time elapsed from start of measurement) and each vertical axis represents an output level of a sensor output.

The rotating machine according to the embodiment is equipped with a rotating body which rotates around a predetermined shaft. In the present embodiment, the rotating machine is further equipped with a rotating machine abnormality detection device for detecting abnormality of the rotating body. More specifically, as shown, for example, in FIG. 1, a rotating machine M includes a rotation unit RB having at least first and second rotating bodies, and a rotating machine abnormality detection device AD. For example, the rotating machine abnormality detection device AD includes a vibration measurement unit 1, and a control processing unit 2 having an abnormality detection unit 22. Then, in the example shown in FIG. 1, the rotating machine abnormality detection device AD further includes an input unit 3, an output unit 4, an interface unit (IF unit) 5, and a storage unit 6.

The rotating machine M in which the rotating machine abnormality detection device AD of the present embodiment is incorporated may be an arbitrary device including a rotating body RB, such as an electric motor, a power generator, a compressor, and a pump. Description will be here made of a case, as one example, where the rotating machine M is a compressor.

The rotating machine M as a compressor includes the rotation unit RB having at least the first and second rotating bodies and functioning as a compressor which compressively sends fluid, and a peripheral device, not shown, for driving the rotating body to rotate. The rotation unit RB includes, as shown, for example, in FIG. 2 and FIG. 3, a pair of first and second rotating bodies 81-1 and 81-2 which rotate around respective predetermined shafts while engaging to mesh with each other with a predetermined gap (narrow space) G provided therebetween in a normal state, and a casing 82 which houses the first and second rotating bodies 81-1 and 81-2.

The first rotating body 81-1 is a male rotor in the compressor, and generally includes a first rotating body main body 811-1, a plurality of projections 812-1 formed on a circumference surface of the first rotating body main body, and a first rotation shaft 813-1 coaxially provided with the first rotating body main body 811-1. Such a first rotating body 81-1 is driven to rotate, for example, counterclockwise (in a direction indicated by an arrow A) around the first rotation shaft 813-1. The second rotating body 81-2 is a female rotor in the compressor, and generally includes a second rotating body main body 811-2, a plurality of recesses 812-2 formed on a circumference surface of the second rotating body main body, and a second rotation shaft 813-2 coaxially provided with the second rotating body main body 811-2. Such a second rotating body 81-2 is driven to rotate, for example, clockwise (m a direction indicated by an arrow B) around the second rotation shaft 813-2.

In the following, the plurality of projections 812-1 represents the plurality of projections 812-1 formed on a circumference surface of the first rotating body 81-1, and the projection 812-1 represents any one of the plurality of projections 812-1. The plurality of recesses 812-2 represents the plurality of recesses 812-2 formed on a circumference surface of the second rotating body 81-2, and the recess 812-2 represents any one of the plurality of recesses 812-2.

Counterclockwise rotation of the first rotating body 81-1 and clockwise rotation of the second rotating body 81-2 cause, among the plurality of projections 812-1 and the plurality of recesses 812-2, the projection 812-1 and the recess 812-2 which correspond to each other to mesh with each other in turn. In other words, counterclockwise rotation of the first rotating body 81-1 and clockwise rotation of the second rotating body 81-2 cause a certain projection 812-1 and a certain corresponding recess 812-2 to mesh with each other, and further rotation of the same eliminates meshing thereof and causes a subsequent projection 812-1 and a subsequent corresponding recess 812-2 to mesh with each other, and further rotation of the same eliminates meshing thereof and causes a subsequent projection 812-1 and a subsequent corresponding recess 812-2 to mesh with each other. Hereinafter, this operation will be repeated. Then, this leads to compression of fluid.

When the projection 812-1 and the recess 812-2 mesh with each other, the projection 812-1 fits into the recess 812-2, and in the normal state, the projection 812-1 and the recess 812-2 have the predetermined gap G without contacting with each other. Contact between the projection 812-1 and the recess 812-2 means contact between the first rotating body 81-1 and the second rotating body 81-2, which is one mode of an abnormal state.

The casing 82 is a hollow cylindrical body that is oval in a section and that has a space in which the first and second rotating bodies 81-1 and 81-2 can be housed to have a predetermined interval from an inner circumference surface of the casing 82, the first and second rotating bodies 81-1 and 81-2 being provided in parallel so as to have the respective shafts parallel to each other. The casing 82 is provided with an inflow port, not shown, on a one axial side of the first and second rotating bodies 81-1 and 81-2, the inflow port taking in fluid to be compressed, and is provided with an outflow port, not shown, on the other side of the first and second rotating bodies 81-1 and 81-2, the outflow port taking out fluid compressed by the first and second rotating bodies 81-1 and 81-2.

Then, in the present embodiment, for detecting abnormality of the rotating body by the rotating machine abnormality detection device AD, the vibration measurement unit 1 is attached at a predetermined position set in advance on an outer wall of the casing 82. A plurality of the vibration measurement units 1 may be attached at positions different from each other on the casing 82. FIG. 2 shows, as one example, the vibration measurement unit 1 attached to the outer wall of the casing 82 at a position deviated from a generally central position in the axial direction of the casing 82 to one side.

The vibration measurement unit 1 is a device, connected to the control processing unit 2, for measuring vibration caused by the rotating body 81 in order to detect abnormality occurring in the rotating machine M, in particular, in the rotating body 81 of the rotation unit RB. In the present embodiment, the vibration measurement unit 1 measures vibration caused by at least one of the first and second rotating bodies 81-1 and 81-2. The vibration measurement unit 1 preferably measures at least one of vibration of an audible band and vibration of an ultrasonic band. The audible band is in general in a range of 20 Hz to 20 kHz, and the ultrasonic band is in general 20 kHz or more. Such a vibration measurement unit 1 is, for example, an AE (Acoustic Emission) sensor and the like. The vibration measurement unit 1 including the AE sensor observes and measures an elastic wave of a predetermined wavelength band caused by the rotating body 81 due to abnormality such as contact. A measurement result of measurement by the vibration measurement unit 1 is output to the control processing unit 2. More specifically, the vibration measurement unit 1 observes vibration and outputs a measurement result of the vibration to the control processing unit 2. The control processing unit 2 samples, as measurement data, the measurement result input from the vibration measurement unit 1 at a predetermined time interval (sampling interval) set in advance. This allows the control processing unit 2 to obtain consecutive time-series measurement data at a sampling interval.

The input unit 3 is a device, connected to the control processing unit 2, for inputting, to the rotating machine abnormality detection device AD (the rotating machine M), various kinds of commands such as a command for instructing on start of abnormality detection, and various kinds of data necessary for detecting abnormality such as input of an identifier (ID) in the rotating machine M (or the rotating body 81) from which abnormality is to be detected. Examples of the input unit 3 include a plurality of input switches and the like to which a predetermined function is assigned, a keyboard, a mouse, and the like. The output unit 4 is a device, connected to the control processing unit 2, for outputting commands and data input from the input unit 3, and a result detected or measured by the rotating machine abnormality detection device AD according to control of the control processing unit 2. Examples of the output unit 4 include a display device such as a CRT display, an LCD (liquid crystal display), or an organic EL display, a printing device such as a printer, and the like.

The IF unit 5 is a circuit, connected to the control processing unit 2, for conducting input/output of data to/from an external device under the control of the control processing unit 2. Examples of the IF unit 5 include a serial communication type interface circuit of RS-232C, an interface circuit using an USB (Universal Serial Bus) standard, and the like.

The storage unit 6 is connected to the control processing unit 2 and stores each control processing program such as a control program for causing each unit of the rotating machine abnormality detection device AD to operate according to a function of the unit, an abnormality detection program for detecting abnormality of the rotating machine M, and the like under the control of the control processing unit 2; and information and the like necessary for executing each control processing program. The storage unit 6 is configured to include a non-volatile storage element such as an ROM (Read Only Memory) and a rewritable non-volatile storage element such as an EEPROM (Electrically Erasable Programmable Read Only Memory), which stores each of the above-described control processing programs and information and the like necessary therefor; a volatile storage element such as a RAM (Random Access Memory) as a working memory, which is a so-called working memory for the control processing unit 2; and peripheral circuits thereof. Then, the storage unit 6 functionally includes a measurement data temporary storage unit 61 and a normal frequency spectrum storage unit 62.

As will be described later, the measurement data temporary storage unit 61 temporarily stores measurement data (time-series measurement data, e.g. 20 seconds, 30 seconds, 40 seconds, 60 seconds, etc.) measured by the vibration measurement unit 1 and necessary for obtaining at least a frequency spectrum. When storing measurement data up to the limit of a storage capacity, the measurement data temporary storage unit 61 deletes the temporarily oldest stored measurement data and stores latest measurement data. The storage capacity of the measurement data temporary storage unit 61 is not less than a capacity of the above measurement data necessary for obtaining at least a frequency spectrum.

The normal frequency spectrum storage unit 62 stores a normal frequency spectrum. The normal frequency spectrum is a frequency spectrum of measurement data measured by the vibration measurement unit 1 when determination is made that no abnormality is present by the abnormality determination unit 223 to be described later in the abnormality detection unit 22. Preferably, when latest determination is made by the abnormality determination unit 223 that no abnormality is present, the normal frequency spectrum storage unit 62 stores (updates and stores), as a normal frequency spectrum, a frequency spectrum of measurement data measured by the vibration measurement unit 1 and used for the determination.

The storage unit 6 may further include a storage device with a relatively large capacity, such as a hard disk, for storing time-series measurement data more than the number of pieces of measurement data (time length) necessary for obtaining a frequency spectrum, the measurement data being measured by the vibration measurement unit 1, and for storing various kinds of data obtained by subjecting the measurement data to each predetermined data process.

The control processing unit 2 controls each unit of the rotating machine abnormality detection device AD according to a function of each unit in order to detect abnormality of the rotating machine M, and is configured with a microprocessor such as a CPU (Central Processing Unit) and a peripheral circuit thereof. Then, the control processing unit 2 functionally constitutes a control unit 21 and the abnormality detection unit 22 as a result of execution of the control processing program.

The control unit 21 controls each unit of the rotating machine abnormality detection device AD according to a function of each unit and is in charge of overall control of the rotating machine abnormality detection device AD.

The abnormality detection unit 22 detects abnormality of the rotating machine M based on a measurement result measured by the vibration measurement unit 1. More specifically, in the present embodiment, the abnormality detection unit 22 functionally includes a spectrum processing unit 221, a feature amount processing unit 222, the abnormality determination unit 223, and a noise determination unit 224 as a result of execution of the control processing program.

The spectrum processing unit 221 obtains a frequency spectrum of measurement data measured by the vibration measurement unit 1. Since in the present embodiment, while the feature amount processing unit 222 uses a frequency spectrum (A-frequency spectrum) of an RMS of measurement data measured by the vibration measurement unit 1, the noise determination unit 224 uses a frequency spectrum (B-frequency spectrum) of measurement data itself measured by the vibration measurement unit 1, the spectrum processing unit 221 functionally includes, so as to cope with such use, an A-subspectrum processing unit 2211 which obtains an A-frequency spectrum for the feature amount processing unit 222 and a B-subspectrum processing unit 2212 which obtains a B-frequency spectrum for the noise determination unit 224.

More specifically, the A-subspectrum processing unit 2211 obtains an RMS (Root Mean Square) of measurement data measured by the vibration measurement unit 1 and Fourier-transforms, for example, fast Fourier-transforms the obtained RMS of the measurement data, thereby obtaining an A-frequency spectrum (A-power spectrum) of the measurement data. In one example, from measurement data shown in FIG. 4A, the A-subspectrum processing unit 2211 obtains an RMS of the measurement data shown in FIG. 4B and then, the A-subspectrum processing unit 2211 obtains an A-frequency spectrum (A-power spectrum) of the measurement data shown in FIG. 4C. A time constant (the number of pieces of measurement data for obtaining an RMS) of an RMS is appropriately set in consideration of a sampling rate of the vibration measurement unit 1 and the number of rotations of the rotating body 81. FIG. 4 shows a measurement result of a rotating machine M including the first rotating body 81-1 having three teeth and the second rotating body 81-2 having four teeth, in which FIG. 4C shows an example where a third harmonic component F3 is strongest, which represents that the second rotating body 81-2 having four teeth contacts every one rotation.

In place of the A-subspectrum processing unit 2211 which obtains an RMS to obtain an A-frequency spectrum, a C-subspectrum processing unit 2213 may be used which obtains an envelope indicated by a broken line in FIG. 1 to obtain a frequency spectrum (C-frequency spectrum). For example, the C-subspectrum processing unit 2213 obtains an envelope of measurement data measured by the vibration measurement unit 1 by envelope detection, and Fourier-transforms (preferably fast Fourier-transforms) the obtained envelope of the measurement data to obtain a frequency spectrum (C-frequency spectrum, C-power spectrum) of the measurement data.

The B-subspectrum processing unit 2212 obtains a B-frequency spectrum (B-power spectrum) of the measurement data by Fourier-transforming, for example, by fast Fourier-transforming the measurement data as it is, the measurement data being measured by the vibration measurement unit 1. In other words, the B-subspectrum processing unit 2212 Fourier-transforms measurement data measured by the vibration measurement unit 1 (raw measurement data measured by the vibration measurement unit 1) as it is.

Although when background noise generally constantly generated is relatively low as shown, for example, in FIG. 4A, an RMS of the measurement data or an envelope of the measurement data may be obtained from measurement data of the vibration measurement unit 1 as described above, there is also a case where the background noise is relatively high as shown, for example, FIG. 5A due to installation environment of; for example, the rotating machine M or the like, and in such a case, a signal indicative of abnormality of the rotating body 81 may be buried in the background noise and not explicitly appear in some cases. In such a case, for taking out the signal indicative of the abnormality of the rotating body 81, the spectrum processing unit 221 may further include a high-pass filter 2214 for removing noise such as the background noise as indicated, for example, by the broken line in FIG. 1. A cut-off frequency of the high-pass filter 2214 may be appropriately set taking a frequency of the signal indicative of the abnormality of the rotating body 81 into consideration and is set, for example, to be a value such as 100 kHz. With respect to measurement data filtered by the high-pass filter 2214, these A-subspectrum processing unit 2211 and C-subspectrum processing unit 2213 described above obtain an RMS and an envelope of the measurement data to obtain a frequency spectrum of the measurement data. Similarly, with respect to the measurement data filtered by the high-pass filter 2214, the above-described B-subspectrum processing unit 2212 obtains a frequency spectrum of the measurement data.

The feature amount processing unit 222 obtains a predetermined feature amount CV related to a predetermined frequency component, based on the frequency spectrum obtained by the spectrum processing unit 221. In the present embodiment, the feature amount processing unit 222 obtains a predetermined feature amount CV related to a predetermined frequency component, based on the A-frequency spectrum obtained by the A-subspectrum processing unit 2211 of the spectrum processing unit 221 as described above. More specifically, when a first number of teeth and a first rotation frequency of the first rotating body 81-1 are represented as MA [unit] and VA [Hz], respectively, a second number of teeth and a second rotation frequency of the second rotating body 81-2 are represented as MB [unit] and VB [Hz], respectively, a least common multiple of the first number of teeth MA and the second number of teeth MB is represented as XAB, a basic wave mesh frequency VA/MA obtained by dividing the first rotation frequency VA by the first number of teeth MA is represented as f1 [Hz], and n-th harmonic mesh frequencies (n is an integer of 2 or more) with respect to the basic wave mesh frequency f1 are represented as fn [Hz], the feature amount processing unit 222 obtains, from the frequency spectrum obtained by the spectrum processing unit 221, a basic wave component F1 of the basic wave mesh frequency f1 and n-th harmonic components Fn of the n-th harmonic mesh frequencies fn (n=2 to XAB) up to the least common multiple XAB and obtains the predetermined feature amount CV based on the obtained basic wave component F1 and n-th harmonic components Fn.

The predetermined feature amount CV related to the predetermined frequency component may be various values for taking out the signal indicative of the abnormality of the rotating body 81, the signal being included in the measurement data of the vibration measurement unit 1, and taking out various noises included in the measurement data of the vibration measurement unit 1. Examples of the predetermined feature amount CV include feature amounts CVa to CVe of first to fifth modes. Here, the feature amount CVa of the first mode will be first described and the feature amounts CVb to CVe of the second to fifth modes will be described later.

The feature amount CVa of the first mode is a total sum CVa of the basic wave component F1 and the n-th harmonic components Fn obtained above as shown by Formula 1 below. Accordingly, the feature amount processing unit 222 is configured to include a feature amount processing unit 222a which obtains the basic wave component F1 of the basic wave mesh frequency f1 and the n-th harmonic components Fn of the n-th harmonic mesh frequencies fn (n=2 to XAB) up to the least common multiple XAB from the A-frequency spectrum obtained by the spectrum processing unit 221, and obtains a total sum of the obtained basic wave component F1 and n-th harmonic components Fn. As described above, in place of the A-frequency spectrum, the C-frequency spectrum may be used. This is also the case in the following.

$$CVa = \Sigma Fi \tag{1}$$

wherein i represents an integer of 1 to XAB, and Σ represents an arithmetic operator for calculating a sum of F with respect to i.

In a case, for example, where in the first rotating body 81-1, the first number of teeth MA is three and the first rotation frequency VA is 60 Hz (MA=3, VA=60), and in the second rotating body 81-2, the second number of teeth MB is four and the second rotation frequency VB is 45 Hz (MB=4, VB=45), each least common multiple XAB is 12 and the number of combinations of meshes is accordingly 12. Here, since the basic wave mesh frequency f1 is calculated as 20 (=60/3) Hz, the first and second rotating bodies 81-1 and 81-2 will have a total of 12 patterns of mesh frequencies (f1 to f12) including the basic wave mesh frequency f1 of 20 Hz and the n-th harmonic mesh frequencies fn (n=2 to XAB (=12)) of 40 Hz, 60 Hz, 80 Hz . . . , 200, 220, and 240. Therefore, in such a case, the feature amount processing unit 222a obtains, from the A– frequency spectrum, the basic wave component F1 of the basic wave mesh frequency of 20 Hz and the n-th harmonic components Fn of the n-th harmonic mesh frequencies fn (n=2 to 12) up to the least common multiple of 12, and obtains a total sum of the components as the feature amount CVa of the first mode (CVa=ΣFi, i=1 to 12, Σ represents a sum with respect to i).

The abnormality determination unit 223 determines presence/absence of abnormality in the rotating machine M, based on the feature amount CV obtained by the feature amount processing unit 222. More specifically, the abnormality determination unit 223 determines presence/absence of abnormality in the rotating machine M according to whether or not the feature amount CV obtained by the feature amount processing unit 222 is a predetermined threshold value (an abnormality determination threshold value) tha set in advance or more. In more detail, the abnormality determination unit 223 determines that the rotating machine M has abnormality when the feature amount CV obtained by the feature amount processing unit 222 is the abnormality determination threshold value tha or more, and determines that the rotating machine M does not have abnormality when the feature amount CV obtained by the feature amount processing unit 222 is not more than the abnormality determination threshold value tha (when the feature amount CV is less than the abnormality determination threshold value tha). The predetermined threshold value (the abnormality determination threshold value) tha is appropriately set according to a mode of the feature amount CV from measurement data obtained by sampling from the rotating machine M in the normal state and measurement data obtained by sampling from the rotating machine M in the abnormal state. Then, when determination is made that abnormality is absent as a result of the determination, the abnormality determination unit 223 stores, as the normal frequency spectra in the storage unit 6, frequency spectra of measurement data used in the determination. More specifically, when determination is made that abnormality is absent as a result of the determination, the B-subspectrum processing unit 2212 obtains B-frequency spectra from the measurement data used for the determination, and the abnormality determination unit 223 stores the obtained B-frequency spectra as normal frequency spectra in the normal frequency spectrum storage unit 62 of the storage unit 6.

Here, when determining that abnormality is present as a result of determination of the presence/absence of abnormality, the abnormality determination unit 223 considers the determined abnormality as a temporary determination. When the noise determination unit 224 determines that the determination of the abnormality is not caused by noise, the abnormality determination unit 223 ultimately considers the temporary determination as abnormality. When the noise determination unit 224 determines that the determination of the abnormality is caused by noise, the abnormality determination unit 223 abandons the temporarily determined abnormality. Instead of the abandonment, generation of the noise may be output.

When the abnormality determination unit 223 determines that abnormality is present, the noise determination unit 224 determines whether determination of the abnormality is caused by noise or not, based on the frequency spectra obtained by the spectrum processing unit 221. In the present embodiment, as described above, the noise determination unit 224 determines whether the determination of abnormality is caused by noise or not, based on the B-frequency spectra obtained by the B-subspectrum processing unit 2212 of the spectrum processing unit 221. Accordingly, in the present embodiment, when the abnormality determination unit 223 determines that abnormality is absent, the noise determination unit 224 does not execute process of the determination.

More specifically, the noise determination unit 224 determines whether the determination of abnormality is caused by noise or not, based on a difference between the B-frequency spectra obtained by the B-subspectrum processing unit 2212 of the spectrum processing unit 221 and the normal frequency spectra stored in the normal frequency spectrum storage unit 62 of the storage unit 6. In more detail, the noise determination unit 224 determines whether the determination of abnormality is caused by noise or not, based on a subtraction result (a first subtraction result) obtained by subtracting an average value of the difference from a maximum value of the difference. Preferably, the noise determination unit 224 compares the first subtraction result with a predetermined threshold value (a first determination threshold value) thb set in advance, and when the first subtraction result is larger than the first determination threshold value thb (or when the first subtraction result is the first determination threshold value thb or more), determines that the determination of abnormality is caused by noise, and when the first subtraction result is the first determination threshold value thb or less (or when the first subtraction result is less than the first determination threshold value thb), determines that the determination of abnormality is not caused by noise.

Reasons why such data process by the noise determination unit 224 enables the determination of presence/absence of noise will be described in the following.

Figure 6A:
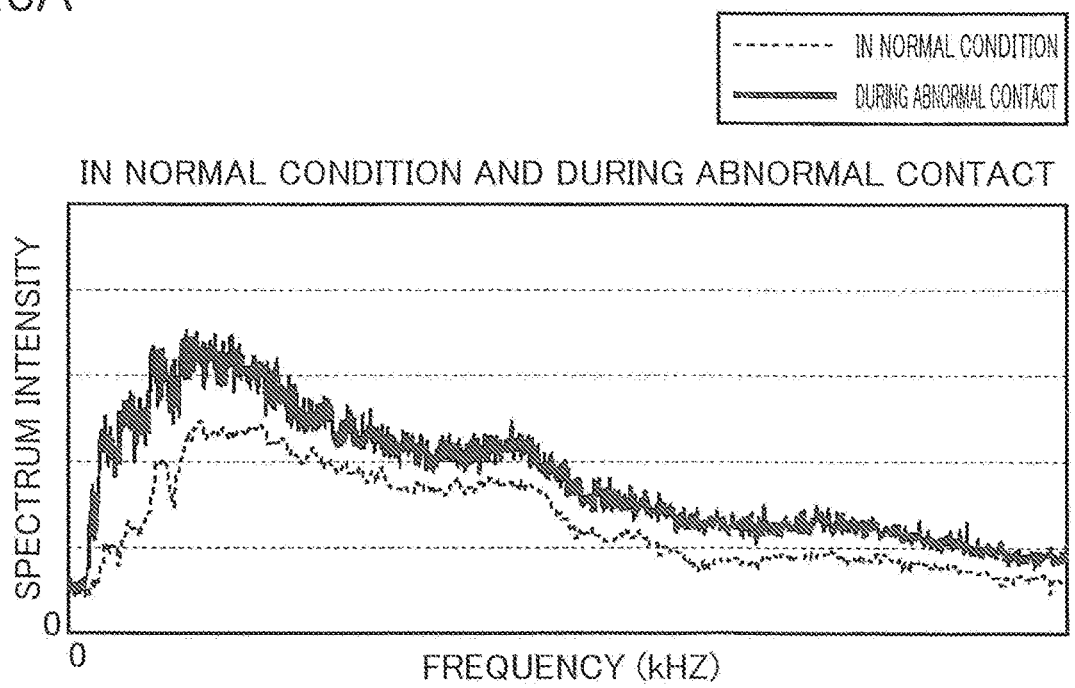
FIG. 6 is a diagram showing each B-frequency spectrum in a normal condition and in an abnormal condition and each B-frequency spectrum in the normal condition and during noise generation.
Figure 6B:
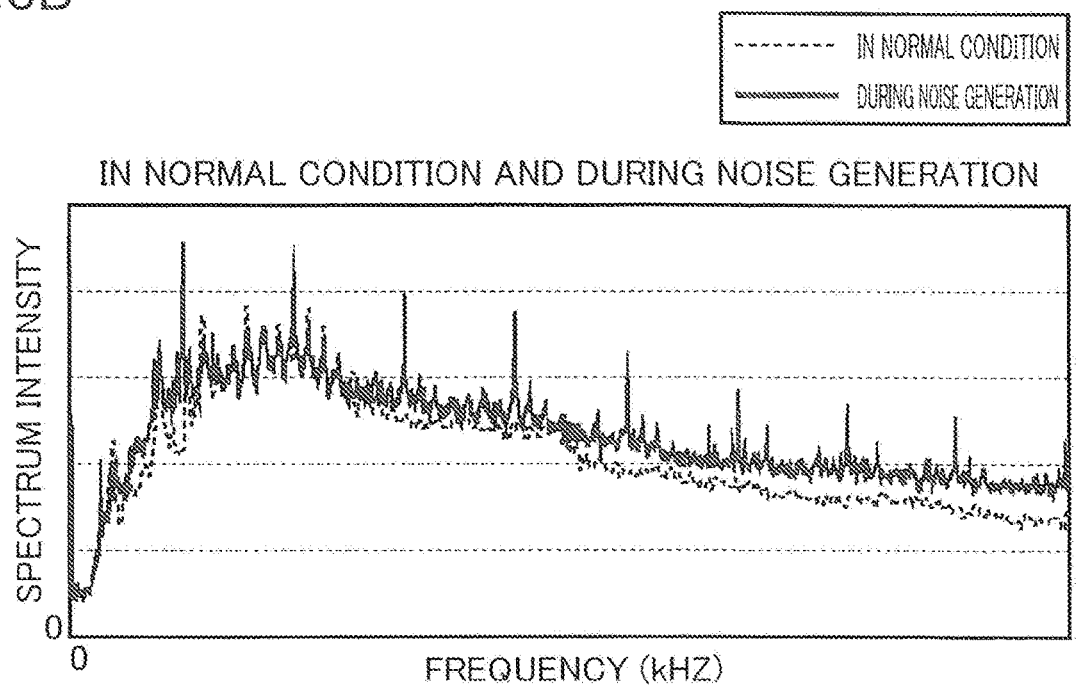
Figure 7:
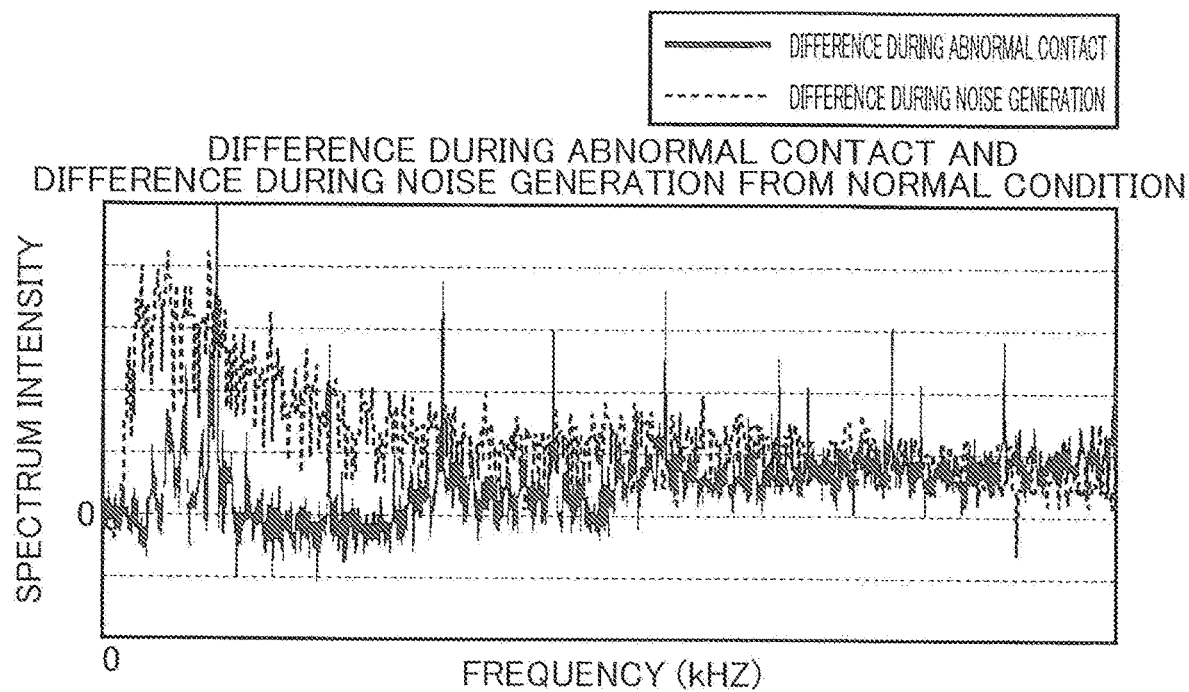
FIG. 7 is a diagram showing a difference between the B-frequency spectrum in the normal condition and that in the abnormal condition and a difference between the B-frequency spectrum in the normal condition and that during noise generation.
Figure 8A:
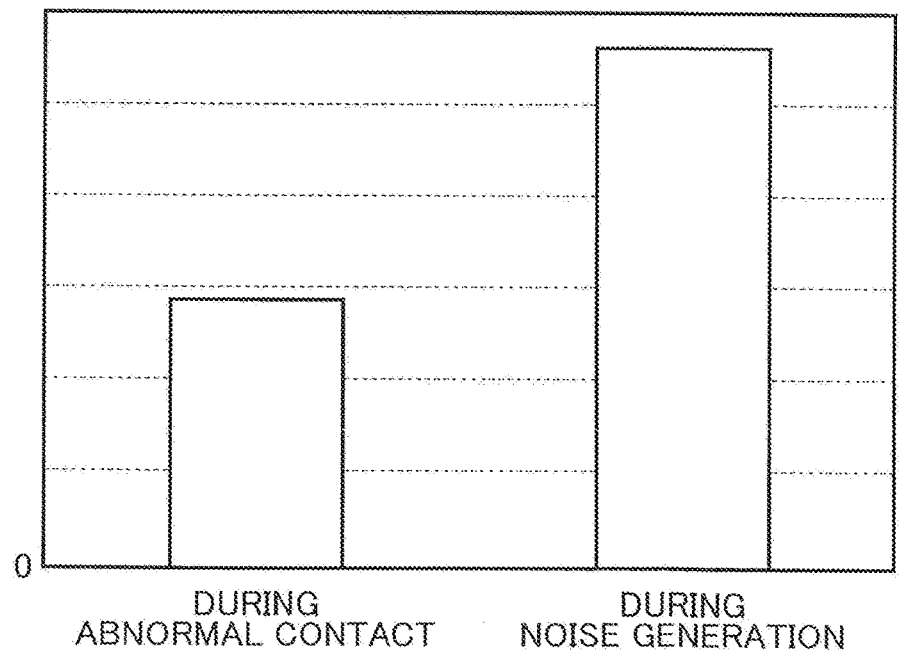
FIG. 8 is a diagram showing a difference between a maximum value and an average value and a difference between the maximum value and an intermediate value.
Figure 8B:
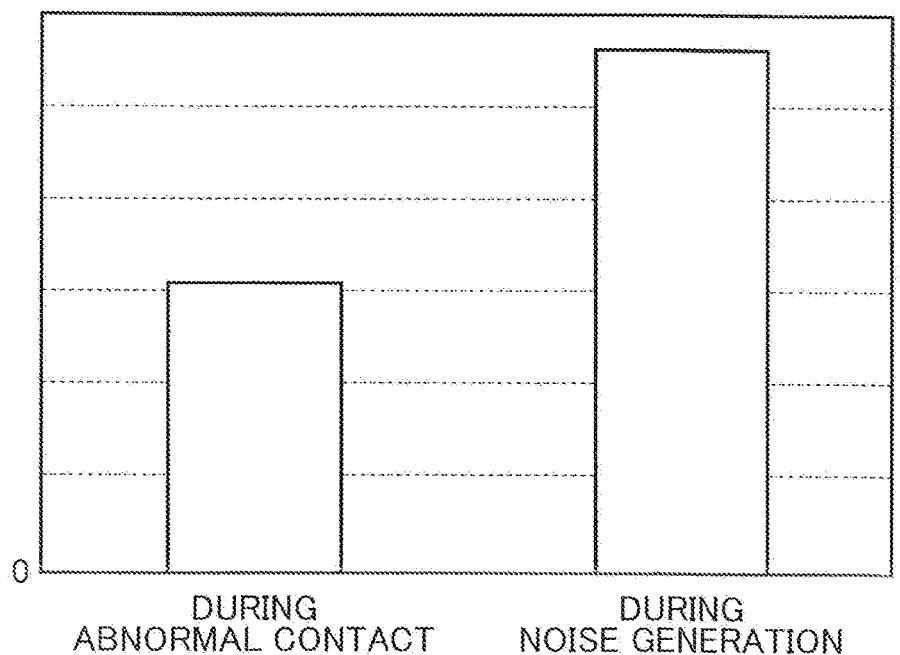
Figure 9:
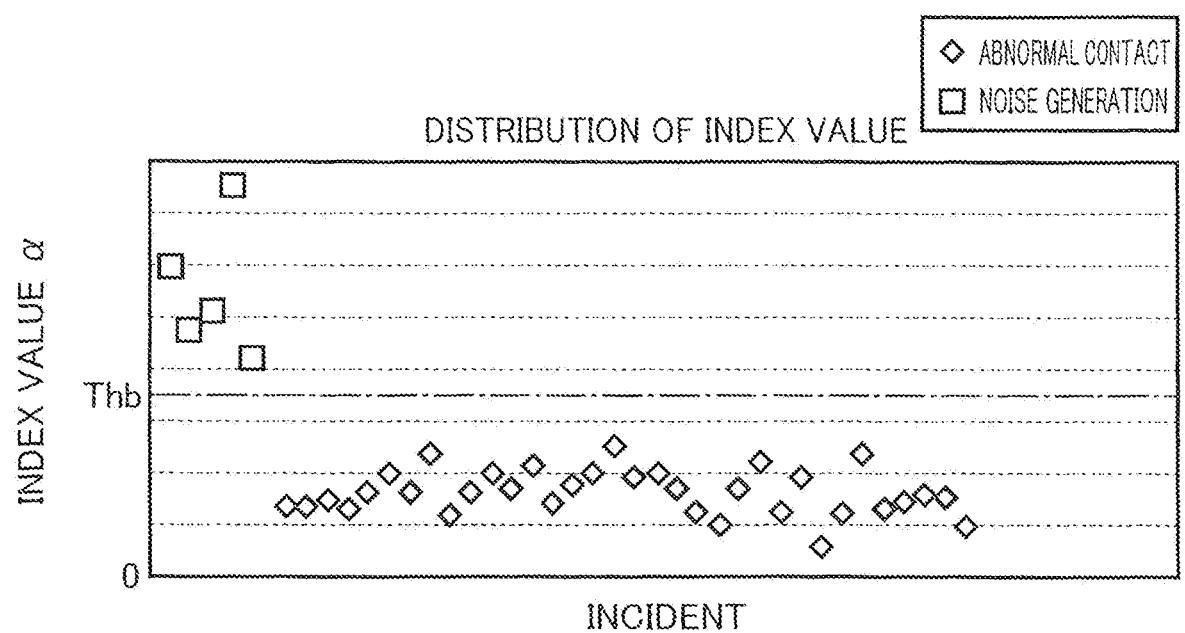
FIG. 9 is a diagram showing a difference between a maximum value and an average value each in the abnormal condition and during noise generation.

FIG. 6 is a diagram showing each B-frequency spectrum in the normal condition and in the abnormal condition and each B-frequency spectrum in the normal condition and during noise generation. FIG. 6A shows each B-frequency spectrum in the normal condition and in the abnormal condition, and FIG. 6B shows each B-frequency spectrum in the normal condition and during noise generation. In FIG. 6A and FIG. 6B, each horizontal axis represents a frequency and each vertical axis represents a spectrum intensity (component value, spectrum value). In each of FIG. 6A and FIG. 6B, a B-frequency spectrum is shown in a frequency range including a frequency higher than the cut-off frequency of the high-pass filter 2214. FIG. 7 is a diagram showing a difference between the B-frequency spectrum in the normal condition and that in the abnormal condition and a difference between the B-frequency spectrum in the normal condition and that during noise generation. In FIG. 7, a horizontal axis represents a frequency and a vertical axis represents a difference value. FIG. 8 is a diagram showing a difference between a maximum value and an average value and a difference between the maximum value and an intermediate value. FIG. 8A shows a difference between a maximum value and an average value, and FIG. 8B shows a difference between the maximum value and an intermediate value. FIG. 9 is a diagram showing a difference between a maximum value and an average value each in the abnormal condition and during noise generation. In FIG. 9, a horizontal axis represents an incident (a measurement data name) and a vertical axis represents an index value α. In FIG. 9, ◇ represents the index value α in the abnormal condition and □ represents the index value α during noise generation.

When the rotating machine M has no abnormality and measurement data measured by the vibration measurement unit 1 does not include the noise (in the normal condition), a B-frequency spectrum (a normal frequency spectrum) obtained from the measurement data in one example is represented by waveforms as indicated by broken lines in FIG. 6A and FIG. 6B.

By contrast, when the rotating machine M has abnormality and measurement data measured by the vibration measurement unit 1 does not include the noise, a B-frequency spectrum (an abnormal frequency spectrum) obtained from the measurement data in one example is represented by a waveform having, in each frequency, a component value larger than the normal frequency spectrum (generally, a waveform having a large component value over the entire frequency range) due to occurrence of abnormality as indicated by a solid line in FIG. 6A.

On the other hand, when the rotating machine M has no abnormality and measurement data measured by the vibration measurement unit 1 includes the noise, a B-frequency spectrum (a noise frequency spectrum) obtained from the measurement data in one example is substantially represented by a waveform having a component value generally the same as the normal frequency spectrum as a whole as indicated by a solid line in FIG. 6B, the waveform having pulse-like component values larger than the normal frequency spectrum at several frequencies due to generation of the noise.

Because of such property, a difference (a first difference) between the abnormal frequency spectrum and the normal frequency spectrum obtained at each frequency is represented by a substantially flat waveform (a flat waveform as an overall tendency) over the entire frequency range as indicated by a solid line in FIG. 7. On the other hand, a difference (a second difference) between the noise frequency spectrum and the normal frequency spectrum obtained at each frequency is represented by a waveform having pulse-like large values at several frequencies as indicated by a broken line in FIG. 7.

As a result, a first subtraction result (during noise generation, the right side of the paper of FIG. 8A) obtained by subtracting, from a maximum value of a second difference between a noise frequency spectrum and a normal frequency spectrum, an average value of the second difference becomes significantly larger than a first subtraction result (during abnormal contact, the left side of the paper of FIG. 8A) obtained by subtracting, from a maximum value of the first difference between an abnormal frequency spectrum and a normal frequency spectrum, the average value of the first difference as shown in FIG. 8A. First subtraction results in other plurality of incidents (samples) are shown in FIG. 9 and the same results are obtained as the results shown in FIG. 8A. Accordingly, it is found from the foregoing that the first subtraction result can be used as an index value α for isolating measurement data during occurrence of abnormality and measurement data during noise generation from among measurement data measured by the vibration measurement unit 1 ((the index value α)=(a first subtraction result)=(a maximum value of the second difference)−(an average value of the second difference)). An average value of the second difference can be obtained by adding each second difference at each frequency (add up all) and dividing the addition result by the number of the respective frequencies.

The first determination threshold value thb is appropriately set to isolate the index value α (◇) during occurrence of abnormality and the index value α (□) during noise generation from among the plurality of incidents as shown in FIG. 9, for example.

As shown in FIG. 8B, a subtraction result (a second subtraction result)(during noise generation, the right side of the paper of FIG. 8B) obtained by subtracting, from a maximum value of a second difference between a noise frequency spectrum and a normal frequency spectrum, an intermediate value (median) of the second difference becomes significantly larger than a second subtraction result (during abnormal contact, the left side of the paper of FIG. 8B) obtained by subtracting, from a maximum value of the first difference between an abnormal frequency spectrum and a normal frequency spectrum, the intermediate value of the first difference. Although not shown, second subtraction results in other plurality of incidents (samples) are the same. Therefore, in place of an average value of the second difference, an intermediate value of the second difference may be used. Specifically, the noise determination unit 224 can determine whether the determination of abnormality is caused by noise or not, based on a subtraction result (the second subtraction result) obtained by subtracting an intermediate value (median) of the second difference from a maximum value of the second difference. In this case, the noise determination unit 224 preferably compares the second subtraction result with a threshold value (a second determination threshold value) thc set in advance, and when the second subtraction result is larger than the second determination threshold value thc (or when the second subtraction result is the second determination threshold value thc or more), determines that the determination of abnormality is caused by noise, and when the second subtraction result is the second determination threshold value thc or less (or when the second subtraction result is less than the second determination threshold value thc), determines that the determination of abnormality is not caused by noise.

Figure 10:
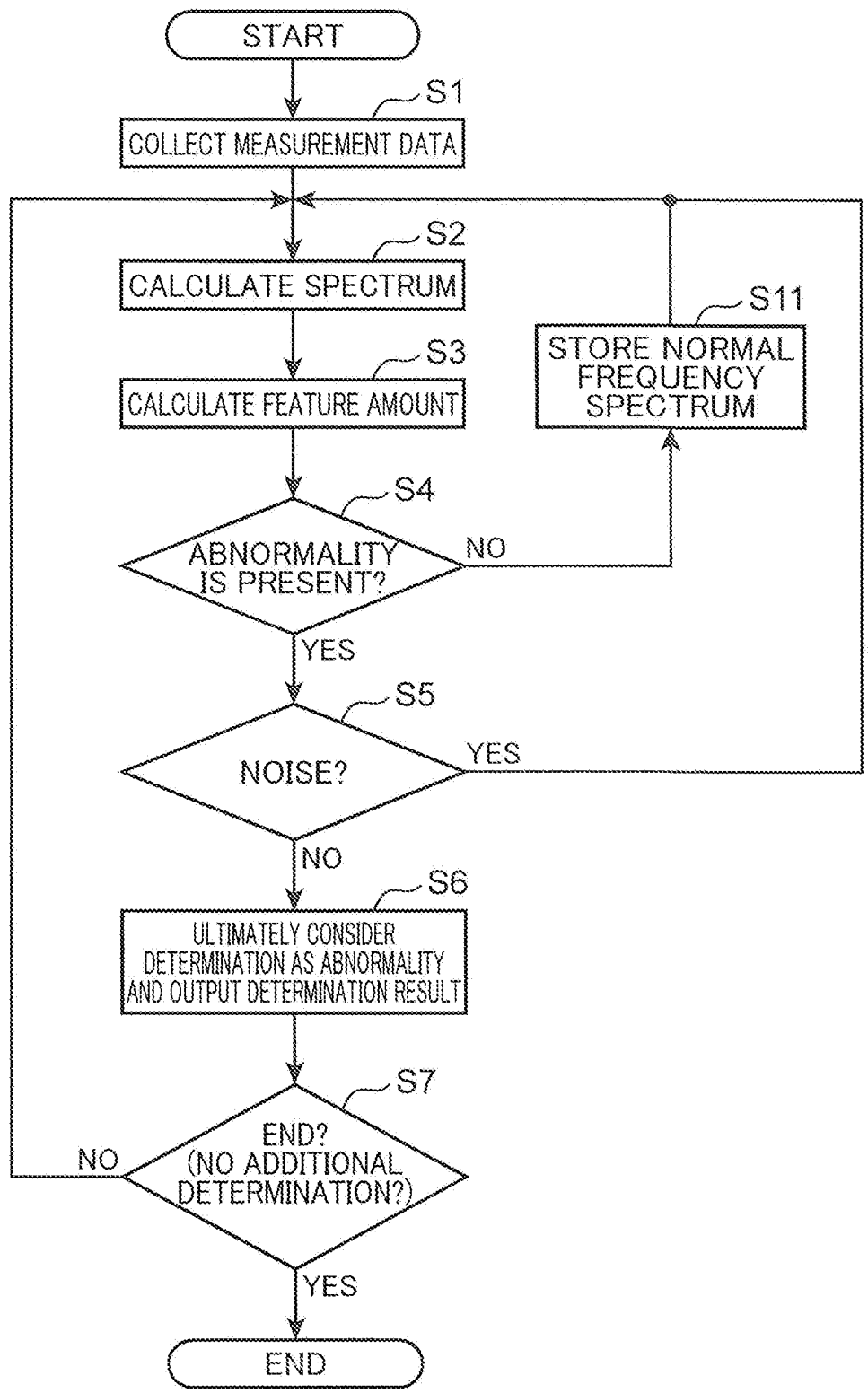
FIG. 10 is a flow chart showing operation of the rotating machine abnormality detection device according to the embodiment.

Next, operation of the present embodiment will be described. FIG. 10 is a flow chart showing operation of the rotating machine abnormality detection device in the embodiment.

For example, when a user operates an activation switch, not shown, to start running of the rotating machine M, the rotating machine abnormality detection device AD executes a control processing program. Execution of the control processing program functionally constitutes the control unit 21 and the abnormality detection unit 22 in the control processing unit 2, functionally constitutes the spectrum processing unit 221, the feature amount processing unit 222 (the feature amount processing unit 222a here), the abnormality determination unit 223, and the noise determination unit 224 in the abnormality detection unit 22, and functionally constitutes the A-subspectrum processing unit 2211 and the B-subspectrum processing unit 2212 in the spectrum processing unit 221. Then, the rotating machine abnormality detection device AD detects abnormality of the rotating machine M by the following operation.

First, the vibration measurement unit 1 observes vibration in the rotating machine M to output a measurement result of the vibration to the control processing unit 2.

In FIG. 10, first, the rotating machine abnormality detection device AD collects measurement data by the control processing unit 2 (S1). More specifically, in the above-described state, the control processing unit 2 samples a measurement result (an output of the vibration measurement unit 1) input from the vibration measurement unit 1 as measurement data at a predetermined sampling interval by the control unit 21 and stores the sampled measurement data in the measurement data temporary storage unit 61 of the storage unit 6. In this manner, the measurement result is successively measured at sampling intervals and measurement data composed of a plurality of time-series data is stored in the measurement data temporary storage unit 61. When each time-series measurement data is stored up to the limit of the storage capacity of the measurement data temporary storage unit 61 (up to the limit of the storage capacity ensured as the measurement data temporary storage unit 61 in the storage unit 6), temporally oldest sampled and stored measurement data is deleted from the measurement data temporary storage unit 61 and newly sampled measurement data is stored in the measurement data temporary storage unit 61.

Next, by the A-subspectrum processing unit 2211 (or the C-subspectrum processing unit 2213) of the spectrum processing unit 221 in the abnormality detection unit 22, the rotating machine abnormality detection device AD obtains an RMS of measurement data (or an envelope of the measurement data) from measurement data in a predetermined time range set in advance (measurement data of each measurement result measured from a latest measurement time point to a time point dated back by time corresponding to the predetermined time range), the measurement data being stored in the storage unit 6 and including latest measured (sampled) measurement data, and fast Fourier-transforms (FFT) the obtained RMS of the measurement data (or the envelope of the measurement data) to obtain a first frequency spectrum (or a C-frequency spectrum) of the measurement data (S2). As described above, measurement data can be filtered by the high-pass filter 2214 before obtaining an RMS or an envelope.

Next, by the feature amount processing unit 222 of the abnormality detection unit 22, the rotating machine abnormality detection device AD obtains the predetermined feature amount CV based on a frequency spectrum obtained by the spectrum processing unit 221 (S3). Here, the feature amount processing unit 222a obtains the feature amount CVa of the first mode, i.e., a total sum of the basic wave component F1 and the n-th harmonic components Fn (CVa=ΣFi, i=1 to 12, Σ represents a sum with respect to i). In consideration of an error of the number of rotations of the rotating body 81, in order to include each component of the basic wave component F1 and the n-th harmonic components Fn, several pieces of data before and after each component of the basic wave component F1 and the n-th harmonic components Fn may be added to the total sum.

Next, by the abnormality determination unit 223 of the abnormality detection unit 22, the rotating machine abnormality detection device AD determines presence/absence of abnormality in the rotating machine M, based on the predetermined feature amount CV obtained by the feature amount processing unit 222 (S4). More specifically, here, the abnormality determination unit 223 determines presence/absence of abnormality in the rotating machine M by determining whether or not the feature amount CVa of the first mode obtained by the feature amount processing unit 222a is the predetermined threshold value (the abnormality determination threshold value) tha or more. As a result of the determination, when the feature amount CVa of the first mode obtained by the feature amount processing unit 222a is the abnormality determination threshold value tha or more, the abnormality determination unit 223 determines that the rotating machine M has abnormality (Yes), and then executes process of S5. On the other hand, as a result of the determination, when the feature amount CVa of the first mode obtained by the feature amount processing unit 222a is not more than the abnormality determination threshold value tha, the abnormality determination unit 223 determines that the rotating machine M has no abnormality (No), and then executes process of S11.

In the process of S11, when the abnormality determination unit 223 of the abnormality detection unit 22 determines that abnormality is absent, the rotating machine abnormality detection device AD obtains a B-frequency spectrum by the B-subspectrum processing unit 2212 from measurement data used for the determination, stores the obtained B-frequency spectrum as a normal frequency spectrum in the normal frequency spectrum storage unit 62 of the storage unit 6, and returns the process to the process of S2. When a normal frequency spectrum is stored in the normal frequency spectrum storage unit 62, the normal frequency spectrum storage unit 62 is updated by the obtained B-frequency spectrum, and the obtained B-frequency spectrum is stored in the normal frequency spectrum storage unit 62. Accordingly, when latest determination is made that the abnormality is absent by the abnormality determination unit 223, the B-frequency spectrum of the measurement data measured by the vibration measurement unit 1 is stored as a normal frequency spectrum (updated and stored) in the normal frequency spectrum storage unit 62 of the storage unit 6.

On the other hand, in process of S5, by the noise determination unit 224 of the abnormality detection unit 22, the rotating machine abnormality detection device AD determines whether the determination of abnormality in the process of S4 is caused by noise or not, based on the frequency spectrum obtained by the spectrum processing unit 221. More specifically, in the present embodiment, by the B-subspectrum processing unit 2212 of the spectrum processing unit 221, the noise determination unit 224 first obtains a B-frequency spectrum of the measurement data to obtain a difference (a second difference) between the obtained B-frequency spectrum and a normal frequency spectrum stored in the normal frequency spectrum storage unit 62 of the storage unit 6. As described above, measurement data can be filtered by the high-pass filter 2214 before obtaining a B-frequency spectrum. Next, the noise determination unit 224 obtains a subtraction result (a first subtraction result) by subtracting an average value of the second difference from a maximum value of the second difference. Then, the noise determination unit 224 compares the first subtraction result with the predetermined threshold value (the first determination threshold value) thb set in advance, and according to the comparison, determines whether the determination of abnormality is caused by noise or not, based on the first subtraction result. As a result of the determination, when the first subtraction result is larger than the first determination threshold value thb (or when the first subtraction result is the first determination threshold value thb or more), the noise determination unit 224 determines that the determination of abnormality is caused by noise (Yes) and returns the process to the process of S2. Accordingly, in the present embodiment, the determination result made by the abnormality determination unit 223 in the process of S4 that abnormality is present is abandoned. On the other hand, as a result of the determination, when the first subtraction result is the first determination threshold value thb or less (or when the first subtraction result is less than the first determination threshold value thb), the noise determination unit 224 determines that the determination of abnormality is not caused by noise (No), and then executes process of S6. As described above, in place of the average value, the intermediate value (median) can be used, and in this case, in place of the first determination threshold value thb, the third second determination threshold value the is used.

In the process of S6, in the rotating machine abnormality detection device AD, the abnormality determination unit 223 of the abnormality detection unit 22 considers, as an ultimate determination result, the determination result made by the abnormality determination unit 223 in the process of S4 that abnormality is present, and the control unit 21 outputs the determination result (abnormality is present) of the process of S4 to the output unit 4.

Next, the rotating machine abnormality detection device AD determines whether the process ends or not, i.e., subsequent determination of abnormality is necessary or not by the control processing unit 2 (S7). As a result of the determination, when the process is to end (unnecessary) (Yes), the control processing unit 2 ends the present process, and when the process is not to end (necessary) (No), returns the process to the process of S2. Wait process for waiting for a predetermined time may be executed before returning the process to the process of S2. This realizes successive execution of determination of abnormality at an interval of a predetermined time.

As described in the foregoing, since in the rotating machine abnormality detection device AD, the rotating machine abnormality detection method implemented therein, and the rotating machine M equipped therewith according to the present embodiment, when the noise determination unit 224 determines that abnormality is not caused by the noise, abnormality determined by the abnormality determination unit 223 is ultimately considered as abnormality, it is possible to discriminate between determination of abnormality caused by the noise and determination of abnormality not caused by the noise to determine abnormality with higher reliability. Then, since according to the above rotating machine abnormality detection device AD, rotating machine abnormality detection method, and rotating machine M, the noise determination unit 224 executes determination process when determination is made by the abnormality determination unit 223 that abnormality is present, the noise determination unit 224 therefore does not execute the determination process when determination is made by the abnormality determination unit 223 that abnormality is absent, so that the amount of the data process can be reduced accordingly.

Since according to the above rotating machine abnormality detection device AD, rotating machine abnormality detection method, and rotating machine M, determination whether the determination of abnormality is caused by noise or not is made based on a normal frequency spectrum, it is possible to exactly capture noise which is generated not all the time but occasionally, so that abnormality can be determined with higher reliability. In particular, by determining whether the determination of abnormality is caused by noise or not based on a latest normal frequency spectrum, even when a normal frequency spectrum changes, it is possible to exactly capture noise which is generated not all the time but occasionally.

Since according to the above rotating machine abnormality detection device AD, rotating machine abnormality detection method, and rotating machine M, determination whether the determination of abnormality is caused by noise or not is made based on the first subtraction result, the properties described using FIG. 6, FIG. 7, FIG. 8A, and FIG. 9 can be used, and abnormality can be determined with higher reliability. Also when the second subtraction result is used in place of the first subtraction result, the above rotating machine abnormality detection device AD, rotating machine abnormality detection method, and rotating machine M can use the properties described using FIG. 6, FIG. 7 and FIG. 8B, so that abnormality can be determined with higher reliability.

Since according to the above rotating machine abnormality detection device AD, rotating machine abnormality detection method, and rotating machine M, a frequency VA/MA obtained by dividing the first rotation frequency VA by the first number of teeth MA is represented as the basic wave mesh frequency f1 [Hz] and a least common multiple of the first number of teeth MA and the second number of teeth MB is represented as XAB, and a basic wave component F1 of the basic wave mesh frequency f1 and n-th harmonic components Fn of n-th harmonic mesh frequencies fn (n=2 to XAB) with respect to the basic wave mesh frequency f1 up to the least common multiple XAB are obtained from a frequency spectrum, the frequency components F1 and Fn related to all the combinations of contacts in the first and second rotating bodies 81-1 and 81-2 can be obtained. Then, the above rotating machine abnormality detection device AD, rotating machine abnormality detection method, and rotating machine M determine contact/non-contact based on the frequency components F1 and Fn related to all the combinations of contacts, so that abnormality can be determined with higher precision.

When the above-described high-pass filter 2214 is provided, the above rotating machine abnormality detection device AD, rotating machine abnormality detection method, and rotating machine M enable removal of background noise distributed in a relatively low frequency band to detect abnormality with higher precision. In particular, since background noise in a compressor is generated mainly due to vibration, background noise intensively distributes in a relatively low frequency band, while signals caused by contact are generated also in a high frequency band. Because of such a difference in a feature, provision of the high-pass filter 2214 improves contact/non-contact detecting performance.

While in the above description, one vibration measurement unit 1 is provided, a plurality of vibration measurement units may be provided and each measurement data measured by each vibration measurement unit 1 can be individually processed.

Also, in the above description, the feature amount processing unit 222, which is configured to include the feature amount processing unit 222*a* that obtains the feature amount CVa of the first mode in the above description, can be configured to include feature amount processing units 222*b* to 222*e* that obtain the feature amounts CVb to CVe of second to fifth modes.

Figure 11:
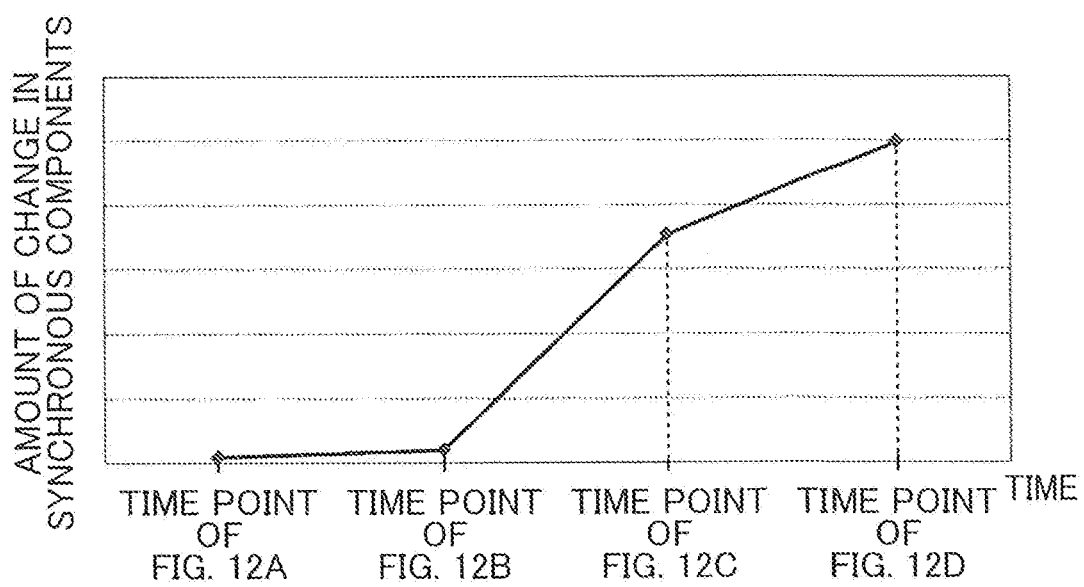
FIG. 11 is a diagram for explaining a feature amount of a second mode.
Figure 13A:
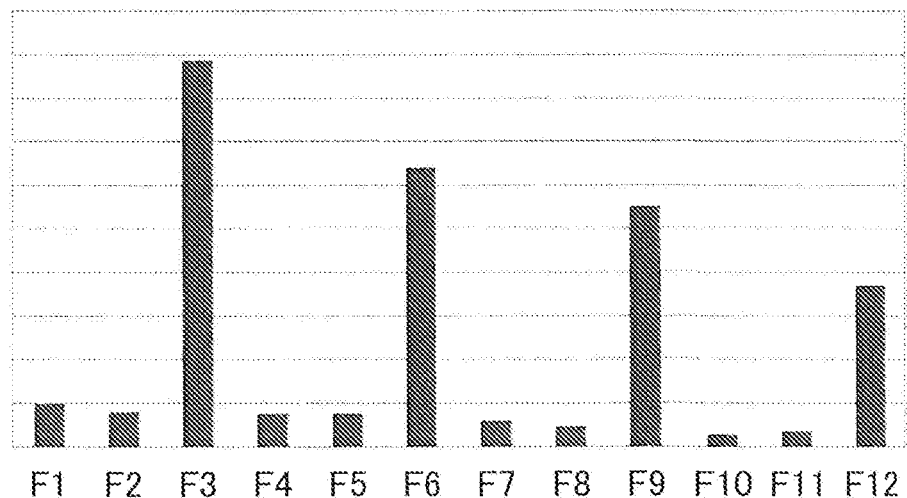
FIG. 13 is a diagram for explaining a feature amount of a third mode.
Figure 13B:
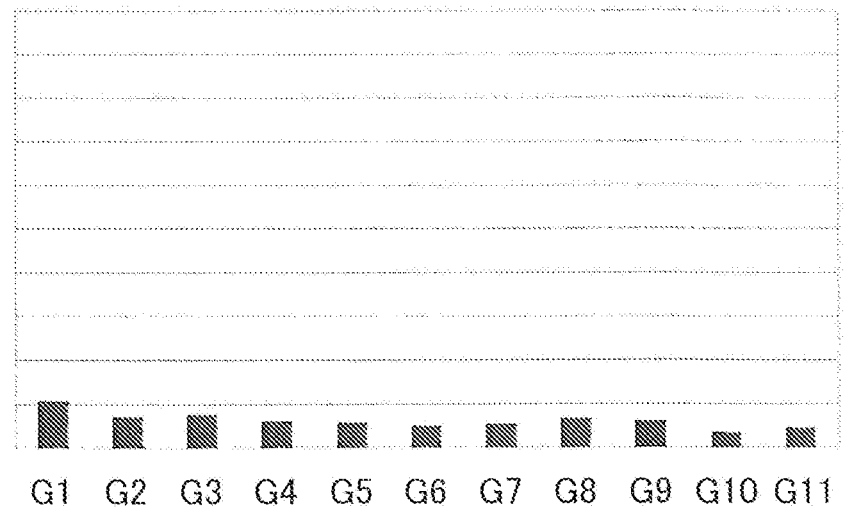
Figure 15A:
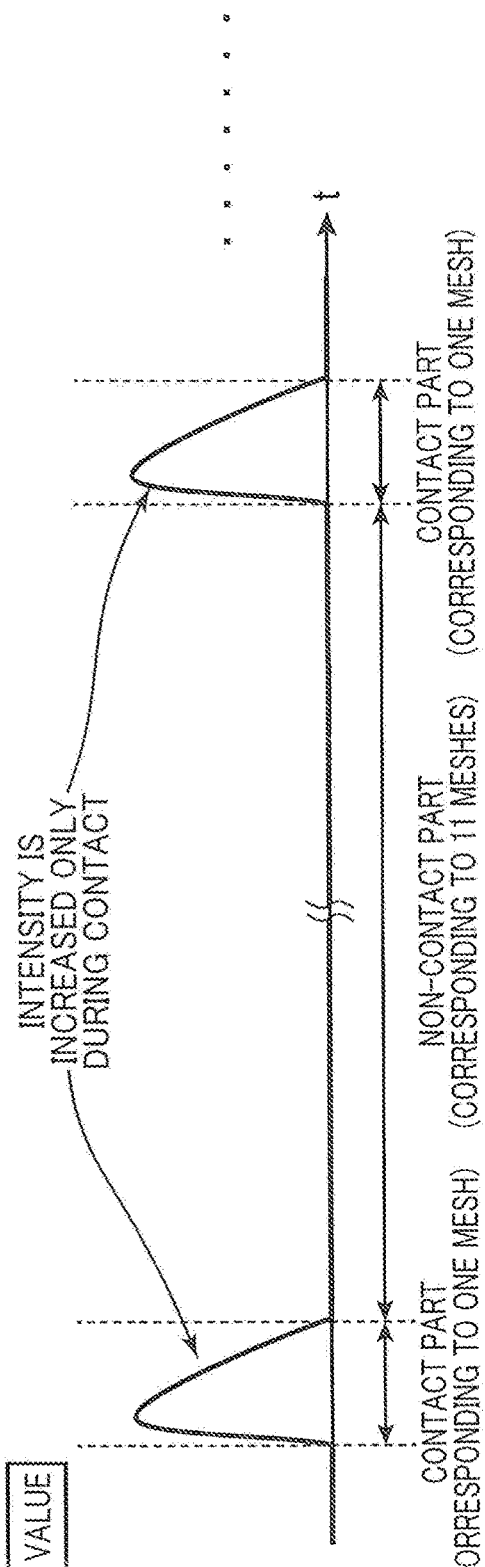
FIG. 15 is a diagram for explaining how to obtain the model information shown in FIG. 14.
Figure 15B:
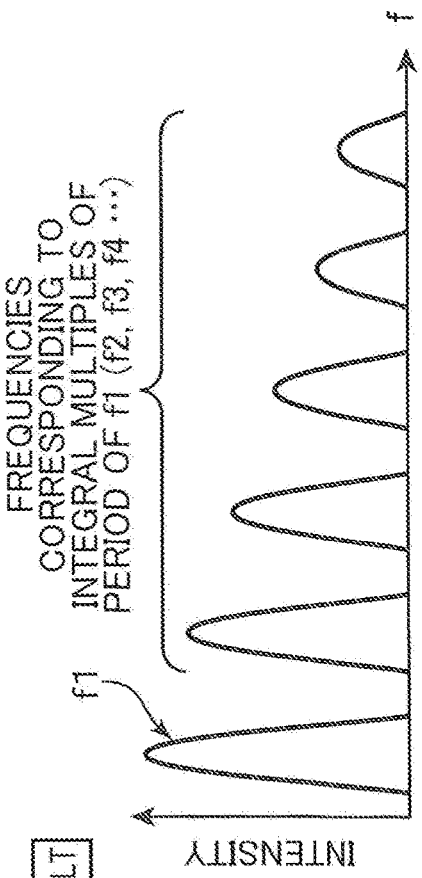
Figure 16:
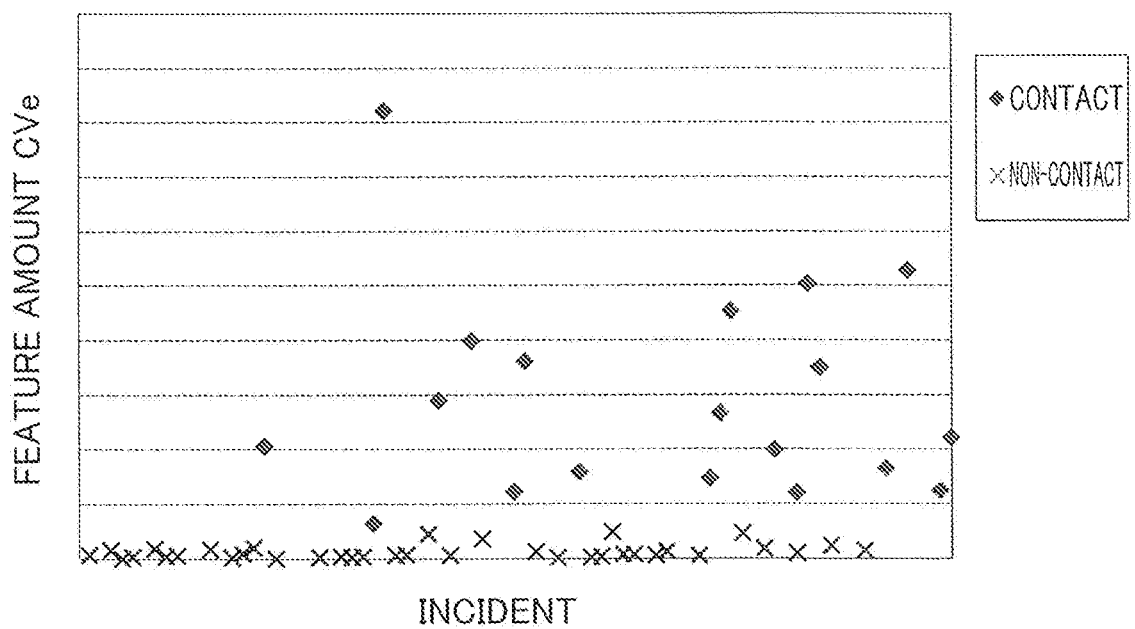
FIG. 16 is a diagram showing one example of an abnormality determination result using a feature amount of a fifth mode.

FIG. 11 is a diagram for explaining a feature amount of the second mode. In FIG. 11, a horizontal axis represents time and a vertical axis represents an amount of change. FIG. 12 is a diagram showing a temporal change of a frequency spectrum before and after occurrence of abnormality. FIG. 12A shows frequency spectra 10 seconds before contact occurs, FIG. 12B shows frequency spectra five seconds before contact occurs, FIG. 12C shows frequency spectra when contact occurs, and FIG. 12D shows frequency spectra two seconds after contact occurs. In each of FIGS. 12A to 12D, a horizontal axis represents a frequency and a vertical axis represents a component value (spectrum intensity, spectrum value). FIG. 13 is a diagram for explaining a feature amount of the third mode. FIG. 13A shows each component of the basic wave mesh frequency f1 and the n-th harmonic mesh frequencies fn, and FIG. 13B shows each non-harmonic component. FIG. 14 is a diagram showing one example of model information related to a feature amount of the fourth mode. FIG. 15 is a diagram for explaining how to obtain the model information shown in FIG. 14. FIG. 15A shows an RMS of measurement data when one mesh contact is brought by one mesh out of 12 meshes and FIG. 15B shows a part of results of Fourier-transform of the measurement data. FIG. 16 is a diagram showing one example of an abnormality determination result using a feature amount of the fifth mode. In FIG. 16, a horizontal axis represents an incident and a vertical axis represents a feature amount (index value β).

First, the feature amount CVb of the second mode will be described. The feature amount CVb of the second mode is an amount of change in the basic wave component F1 and the n-th harmonic components Fn, more specifically, an amount of change in the basic wave component F1 and the n-th harmonic components Fn as time lapses. Before and after contact occurs as abnormality, a frequency spectrum changes in a manner as shown in FIG. 12, and an amount of change in the basic wave component F1 and the n-th harmonic components Fn as time lapses resultantly changes in a manner as shown in FIG. 11. In more detail, before contact occurs, the frequency spectrum barely changes as shown in FIG. 12A and FIG. 12B, and as a result, the amount of change is substantially 0 as shown in FIG. 11. When contact occurs, the frequency spectrum changes in a manner as shown in FIG. 12C, which change appears as the amount of change as shown in FIG. 11. Then, as the contact proceeds, the frequency spectrum further changes as shown in FIG. 12D, which change appears as a larger amount of the change as shown in FIG. 11. Therefore, the amounts of change in the basic wave component F1 and the n-th harmonic components Fn as time lapses are considered to be usable as an index for evaluation of presence/absence of abnormality and are suitable as one of the predetermined feature amounts CV.

When such a feature amount CVb of the second mode is used, the feature amount processing unit 222 is configured to include the feature amount processing unit 222*b* which obtains, from both first and second frequency spectra of first and second measurement data measured in first and second periods different from each other, respectively, basic wave components F1 and n-th harmonic components Fn in each of the first and second periods, and obtains, as the feature amount CVb of the second mode, amounts of change in the obtained basic wave components F1 and n-th harmonic components Fn in each of the first and second periods. More specifically, the feature amount processing unit 222*b* obtains, as the amount of change, a square sum of a difference in components of the obtained basic wave components F1 and n-th harmonic components Fn in each of the first and second periods. When the process is returned from the process of S6 to the process of S2 as described above, since the spectrum processing unit 221 sequentially obtains a frequency spectrum in the periods different from each other, it can be considered that the first and B-frequency spectrum of the first and second measurement data measured in each of the first and second periods different from each other are obtained.

In more detail, when the basic wave component F1 and the n-th harmonic components Fn in the current period (one example of the basic wave component F1 and the n-th harmonic components Fn in the first period) are represented as $Fi\_now$ (i=an integer of 1 to n) and average values of each of the basic wave component F1 and the n-th harmonic components Fn obtained in each period before the current period (one example of the basic wave component F1 and the n-th harmonic components Fn in the second period) are represented as $Fi\_past$ (i=an integer of 1 to n), the feature amount processing unit 222*b* obtains the amount of change, i.e. the feature amount CVb of the second mode, in a manner as shown in Formula 2 below. The periods for calculating the average value $Fi\_past$ are appropriately set according to a cycle for changing a running condition in the target rotating machine M, or the like.

$$CVb = \Sigma(Fi\_now - Fi\_past)^2 \qquad (2)$$

Additionally, although before and after a time point where contact occurs as abnormality, an output of the vibration measurement unit 1 relatively largely changes as described above, also in a case of non-contact, when, for example, the running condition of the rotating machine M changes, the output of the vibration measurement unit 1 may gradually change in some case. Since the amounts of change CVb in the basic wave component F1 and the n-th harmonic components Fn in each of the first and second periods, in particular, the square sum CVb of differences in the components in the periods shown by the Formula 2 represents a periodic change of contact, the amount of change CVb is characterized in becoming relatively large at a time point where contact occurs in a state of non-contact or a time point where a contact state itself changes. Therefore, since the rotating machine abnormality detection device AD which obtains the feature amount CVb of the second mode, the method implemented in the rotating machine abnormality detection device AD, and the rotating machine M using the rotating machine abnormality detection device AD obtain such an amount of change CVb as the predetermined feature amount CV, a time point where contact occurs in a state of non-contact or a time point where a contact state itself changes can be detected with higher precision. Also even when background noise is relatively high, when trend (tendency) of the background noise has no change, the amount of change thereof will not become large, so that the above rotating machine abnormality detection device AD, rotating machine abnormality detection method, and rotating machine M enable reduction in over-detection.

Next, the feature amount CVc of the third mode will be described. The feature amount CVc of the third mode is an amount based on not only the basic wave component F1 and the n-th harmonic components Fn but also non-harmonic components G of predetermined frequencies g present between adjacent frequencies among the basic wave mesh frequency f1 and the n-th harmonic mesh frequencies fn (n=2 to XAB).

When such a feature amount CVc of the third mode is used, the feature amount processing unit 222 is configured to include the feature amount processing unit 222c which further obtains, from the frequency spectra obtained by the spectrum processing unit 221, non-harmonic components G of predetermined frequencies g present between adjacent frequencies among the basic wave mesh frequency f1 and the n-th harmonic mesh frequencies fn (n=2 to XAB) up to the least common multiple XAB and obtains a feature amount CVc of the third mode based on the obtained basic wave component F1, n-th harmonic components Fn, and non-harmonic components G. More specifically, in view of obtaining a frequency most apart from the basic wave mesh frequency f1 and the n-th harmonic mesh frequencies fn, the non-harmonic component G is a component of a frequency at the center between the adjacent frequencies (Gk=(Fk+Fk+1)/2, k=an integer of 1 to XAB−1) as shown in FIG. 13B.

In more detail, the feature amount processing unit 222c further obtains, from the frequency spectra obtained by the spectrum processing unit 221, each non-harmonic component Gk (k is an integer in a range from 1 to (XAB−1)) of each predetermined frequency gk at the center between adjacent frequencies among the basic wave mesh frequency f1 and the n-th harmonic mesh frequencies fn (n=2 to XAB) up to the least common multiple XAB, and considers, as the feature amount CVc of the third mode, a total sum ratio of component obtained by dividing a total sum of the obtained basic wave component F1 and n-th harmonic components Fn (see FIG. 13A) by the obtained total sum of the non-harmonic components Gk (see FIG. 13B) as shown by Formula 3 below. While presence/absence of abnormality may be determined according to a total sum of the non-harmonic components Gk, this method is vulnerable to a change of a background noise level, and therefore, presence/absence of abnormality is determined according to the total sum ratio of component in the present embodiment. This makes it possible to determine that the feature amount CVc of the third mode (=a total sum ratio of component) substantially matches a signal generated due to the rotating body 81.

$$CVc = \text{a total sum ratio of component} = \text{(a total sum of the basic wave component } F1 \text{ and the } n\text{-th harmonic components } Fn)/(\text{a total sum of the non-harmonic components } Gk) = (\Sigma Fi)(\Sigma Gk) \quad (3)$$

There is a case where an output of the vibration measurement unit 1 such as an AE sensor may have single electrical noise or the like superimposed thereon. Since the rotating machine abnormality detection device AD which obtains the feature amount CVc of the third mode, the method implemented in the rotating machine abnormality detection device AD, and the rotating machine M using the rotating machine abnormality detection device AD obtain the predetermined feature amount CV further in consideration of the non-harmonic components G, effects exerted by superposition of single electrical noise or the like onto abnormality detection can be avoided to enable reduction in noise without periodicity.

Next, the feature amount CVd of the fourth mode will be described. The feature amount CVd of the fourth mode is a maximum value of matching degrees obtained between a plurality of models generated in advance for each mode of abnormality in the first and second rotating bodies 81-1 and 81-2. The model is formed with the respective model values of the basic wave component F1 and the n-th harmonic components Fn corresponding to a mode of the abnormality. The matching degree is a value indicative of a degree of matching between the basic wave component F1 and the n-th harmonic components Fn obtained from the frequency spectrum of the measurement data measured by the vibration measurement unit 1, and the model.

When such a feature amount CVd of the fourth mode is used, the rotating machine abnormality detection device AD further includes, in the storage unit 6, a model information storage unit 63 which in advance stores, as model information, the respective model values of the basic wave component F1 and the n-th harmonic components Fn corresponding to a mode of abnormality with respect to each mode of abnormality, as indicated by the broken line in FIG. 1. Then, the feature amount processing unit 222 is configured to include the feature amount processing unit 222d which obtains, with respect to each mode of the abnormality, the degree of matching between the basic wave component F1 and the n-th harmonic components Fn obtained from the frequency spectrum of the measurement data measured by the vibration measurement unit 1, and the model information (the model), and obtains, as the feature amount CVd of the fourth mode, a maximum matching degree from among the matching degrees obtained with respect to the respective modes of the abnormality.

More specifically, the model information is stored in the model information storage unit 63 in table format. This model information table MT includes a contact model field 631 in which model names are registered, and a constant field 632 in which model values of models represented by the model names registered in the contact model field 631 are registered, the table including records for the respective model names as shown, for example, in FIG. 14. For registering the respective model values, the constant field 632 includes as many sub-fields as the number of the least common multiple XAB of the first number of teeth MA and the second number of teeth MB. In the example shown in FIG. 14, since the first number of teeth MA of the first rotating body 81-1 is three and the second number of teeth MB of the second rotating body 81-2 is four as described above, the constant field 632 includes 12 sub-fields 632-1 to 632-12 for registering each model value ai (i=1 to 12). Then, the model information table MT registers six models obtained by modeling abnormality of contact occurring periodically and includes a first line record in which among these 12 patterns of combinations, there is registered each model value ai of contact brought by one mesh out of 12 meshes, which is contact as abnormality brought by one mesh, a second line record in which among these 12 combinations, there is registered each model value ai of contact brought by two meshes out of 12 meshes, which is contact as abnormality brought by two meshes, a third line record in which among these 12 patterns of combinations, there is registered each model value ai of contact brought by three meshes out of 12 meshes, which is contact as abnormality brought by three meshes, a fourth line record in which among these 12 combinations, there is registered each model value ai of contact brought by four meshes out of 12 meshes, which is contact as abnormality brought by four meshes, a fifth line record in which among these 12 combinations, there is registered each model value ai of contact brought by six meshes out of 12 meshes, which is contact as abnormality brought by six meshes, and a sixth line record in which among these 12 combinations, there is registered each model value ai of contact brought by 12 meshes out of 12 meshes, which is contact as abnormality brought by 12 meshes. Each model value ai of each model is obtained in advance, for example, by actually measuring a plurality of samples from a rotating machine M actually having abnormal contact and obtaining a basic wave component F1 and n-th harmonic components Fn from the plurality of samples while conducting statistical process. For example, in a case of contact brought by one mesh out of 12 meshes, when obtaining an RMS from measurement data of a sample, the result shown in 15A is obtained, and fast Fourier-transforming (FFT) the results obtains the result shown in FIG. 15B (a part of the result of the fast Fourier-transform is shown in FIG. 15B). Each peak value of the fast Fourier-transform shown in FIG. 15B corresponds to each model value ai in the model of contact brought by one mesh out of 12 meshes. Each model value ai is normalized such that a total sum of the respective model values ai becomes 1 ($\Sigma ai=1$).

For example, for each model, the feature amount processing unit 222d multiplies each value Fi of the basic wave component F11 and the n-th harmonic components Fn obtained from the frequency spectrum of the measurement data obtained by measurement of the vibration measurement unit 1 by each model value ai of the model (Fi×ai) to obtain a total sum Sm thereof (Sm=$\Sigma$(Fi×ai), i=1 to 12, $\Sigma$ represents a sum with respect to i, in which m is 1 to 6 in this example). The feature amount processing unit 222d obtains a total sum SS of the respective total sums Sm obtained for the respective models (SS=$\Sigma$Sm, m=1 to 6, $\Sigma$ represents a sum with respect to m) and divides (normalize) the total sum Sm for each model by the obtained total sum SS (Sm/SS, m=1 to 6). The result of the division represents a matching degree and such a calculation method enables removal of effect of an absolute value on each component distribution of the basic wave component F1 and the n-th harmonic components Fn. Then, the feature amount processing unit 222d obtains, as the feature amount CVd of the fourth mode, a maximum value among the respective division results (the respective matching degrees) obtained for the respective models.

Since the rotating machine abnormality detection device AD which obtains the feature amount CVd of the fourth mode, the method implemented in the rotating machine abnormality detection device AD, and the rotating machine M using the rotating machine abnormality detection device AD obtain a maximum matching degree from among the matching degrees obtained with respect to each mode of the abnormality (contact mode in the above description) as the predetermined feature amount, electrical pulse noise and noise having a single and relatively large amplitude caused by external impact and, for example, abnormality such as contact can be discriminated to detect abnormality with higher precision.

When the feature amount CVd of the fourth mode is used, the abnormality determination unit 223 may preferably determine that abnormality is present in the rotating machine M in a mode of abnormality having the maximum matching degree among the matching degrees obtained by the feature amount processing unit 222d with respect to each mode of abnormality. When, for example, among the matching degree which corresponds to contact brought by one mesh out of 12 meshes, the matching degree which corresponds to contact brought by two meshes out of 12 meshes, the matching degree which corresponds to contact brought by three meshes out of 12 meshes, the matching degree which corresponds to contact brought by four meshes out of 12 meshes, the matching degree which corresponds to contact brought by six meshes out of 12 meshes, and the matching degree which corresponds to contact brought by 12 meshes out of 12 meshes, the maximum matching degree is the matching degree which corresponds to contact brought by two meshes out of 12 meshes, the abnormality determination unit 223 determines that abnormality is present which corresponds to contact as abnormality which is brought by two meshes out of 12 meshes. This enables detection of a mode of abnormality.

Next, the feature amount CVe of the fifth mode will be described. The feature amount CVe of the fifth mode is an amount based on a plurality of the above-described total sum, amount of change, total sum ratio of component, and maximum matching degree.

When such a feature amount CVe of the fifth mode is used, the feature amount processing unit 222 is configured to include the feature amount processing unit 222e which conducts a plurality of processes among the total sum calculation process, the amount of change calculation process, the total sum ratio of component calculation process, and the maximum matching degree calculation process to obtain a feature amount CVe of the fifth mode based on process results of the plurality of processes conducted. The total sum calculation process is process of obtaining a total sum CVa of the basic wave component F1 and the n-th harmonic components Fn as described above. The amount of change calculation process is process of obtaining the basic wave component F1 and the n-th harmonic component Fn in the first and second periods from the first and second frequency spectra, respectively, to obtain an amount of change CVb in each of the basic wave component F1 and the n-th harmonic components Fn in each of the first and second periods as described above. The total sum ratio of component calculation process is process of further obtaining, from the frequency spectrum, non-harmonic components Gi (i is an integer in a range from 1 to (n−1)) of predetermined frequencies gi present between adjacent frequencies among the basic wave mesh frequency f1 and the n-th harmonic mesh frequencies fn (n=2 to XAB) up to the least common multiple XAB to obtain a total sum ratio of component CVc by dividing the total sum of the obtained basic wave component F1 and n-th harmonic components Fn by the total sum of the obtained non-harmonic components Gi as described above. The maximum matching degree calculation process is process of obtaining, with respect to each mode of abnormality, a matching degree which represents a degree of matching between the obtained basic wave component F1 and n-th harmonic components Fn, and model information, and obtaining a maximum matching degree CVd from among the matching degrees obtained with respect to each mode of the abnormality.

More specifically, the feature amount processing unit 222e obtains the feature amount CVe of the fifth mode by Formula 4 below, for example.

$$CVe = p1*CVa + p2*cVb + p3*CVc + p4*CVd \qquad (4)$$

The feature amount processing unit 222e also obtains the feature amount CVe of the fifth mode by Formula 5 below, for example.

$$CVe = CVa^{p1} * CVb^{p2} * CVc^{p3} * CVd^{p4} \qquad (5)$$

Here, as parameters p1 to p4 (real number) in these Formula 4 and Formula 5, values that can suitably discriminate between contact and non-contact are obtained by a method such as multiple regression analysis or the like by using the total sum CVa, the amount of change CVb, the total sum ratio of component CVc, and the maximum matching degree CVd all obtained from measurement data actually measured by the vibration measurement unit 1 in a case of occurrence of contact, and the total sum CVa, the amount of change CVb, the total sum ratio of component CVc, and the maximum matching degree CVd obtained from measurement data actually measured by the vibration measurement unit 1 in a case of non-contact.

As one example, there are shown in FIG. 16 results of feature amounts CVe (♦) obtained from measurement data actually measured by the vibration measurement unit 1 using Formula 5 when the contact occurs and results of feature amounts CVe (x) obtained from measurement data actually measured by the vibration measurement unit 1 using Formula 5 without contact. As shown in FIG. 16, since distribution of the feature amounts CVe (♦) in a case of contact and distribution of the feature amount CVe (x) in a case of non-contact are substantially explicitly distinguishable, the feature amount CVe shown in Formula 5 enables presence/absence of abnormality caused by contact to be discriminated.

Since the rotating machine abnormality detection device AD which obtains the feature amount CVe of the fifth mode, the method implemented in the rotating machine abnormality detection device AD, and the rotating machine M using the rotating machine abnormality detection device AD obtain the feature amount CVe of the fifth mode based on process results of the plurality of processes conducted, abnormality can be detected with higher precision.

While the above-described Formula 4 and Formula 5 use all of the four data, i.e., the total sum CVa, the amount of change CVb, the total sum ratio of component CVc, and the maximum matching degree CVd, these Formula 4 and Formula 5 can be configured to use an arbitrary combination of two among the total sum CVa, the amount of change CVb, the total sum ratio of component CVc, and the maximum matching degree CVd or these Formula 4 and Formula 5 can be configured to use an arbitrary combination of three among the total sum CVa, the amount of change CVb, the total sum ratio of component CVc, and the maximum matching degree CVd. Since the total sum CVa, the amount of change CVb, the total sum ratio of component CVc, and the maximum matching degree CVd are appropriate amounts for taking out a signal indicative of abnormality of the rotating body 81 included in the measurement data of the vibration measurement unit 1 or removing various noises included in the measurement data of the vibration measurement unit 1 as described above, these Formula 4 and Formula 5 can be preferably configured with a combination of appropriate two according to the above object among the total sum CVa, the amount of change CVb, the total sum ratio of component CVc, and the maximum matching degree CVd, or these Formula 4 and Formula 5 can be preferably configured with a combination of appropriate three according to the above object among the total sum CVa, the amount of change CVb, the total sum ratio of component CVc, and the maximum matching degree CVd.

Additionally, the analysis device disclosed in Patent Literature 1 and the abnormal contact detection device disclosed in Patent Literature 2 differ from the present embodiment in failing to individually detect contact modes.

The present specification discloses techniques of various embodiments as described above, of which main techniques are outlined in the following.

The rotating machine abnormality detection device according to one aspect is a rotating machine abnormality detection device which detects abnormality in a rotating machine having at least a first rotating body and a second rotating body which rotate around respective predetermined shafts while engaging with each other with a predetermined gap provided therebetween in a normal state, the device including a vibration measurement unit which measures vibration caused by at least one of the first and second rotating bodies; a spectrum processing unit which obtains a frequency spectrum of measurement data measured by the vibration measurement unit; a feature amount processing unit which obtains a predetermined feature amount related to a predetermined frequency component, based on the frequency spectrum obtained by the spectrum processing unit; an abnormality determination unit which determines presence/absence of abnormality in the rotating machine, based on the predetermined feature amount obtained by the feature amount processing unit; and a noise determination unit which when determination is made that abnormality is present by the abnormality determination unit, determines, based on the frequency spectrum obtained by the spectrum processing unit, whether the determination of abnormality is caused by noise or not, in which when the noise determination unit determines that the determination of abnormality is not caused by the noise, the abnormality determination unit ultimately considers the determined abnormality as abnormality. Preferably, in the above-described rotating machine abnormality detection device, the spectrum processing unit includes an A-subspectrum processing unit which obtains an RMS (Root Mean Square) of measurement data measured by the vibration measurement unit and Fourier-transforms (preferably fast Fourier-transforms) the obtained RMS of the measurement data, thereby obtaining an A-frequency spectrum (A-power spectrum) of the measurement data, and a B-subspectrum processing unit which Fourier-transforms (preferably, fast Fourier-transforms) measurement data measured by the vibration measurement unit as it is to obtain a B-frequency spectrum (B-power spectrum) of the measurement data, the feature amount processing unit obtains the predetermined feature amount based on the A-frequency spectrum obtained by the A-subspectrum processing unit, and the noise determination unit determines whether the determination of abnormality is caused by noise or not, based on the B-frequency spectrum obtained by the B-subspectrum processing unit. Preferably, in the above-described rotating machine abnormality detection device, the spectrum processing unit includes a C-subspectrum processing unit which obtains an envelope of the measurement data measured by the vibration measurement unit and Fourier-transforms (preferably fast Fourier-transforms) the obtained envelope of the measurement data to obtain a C-frequency spectrum (C-power spectrum) of the measurement data, and the B-subspectrum processing unit which Fourier-transforms (preferably, fast Fourier-transforms) measurement data measured by the vibration measurement unit as it is to obtain a B-frequency spectrum (B-power spectrum) of the measurement data, the feature amount processing unit obtains the predetermined feature amount based on the C-frequency spectrum obtained by the C-subspectrum processing unit, and the noise determination unit determines whether the determination of abnormality is caused by noise or not, based on the B-frequency spectrum obtained by the B-subspectrum processing unit.

Since in such a rotating machine abnormality detection device, when the noise determination unit determines that the determination of abnormality is not caused by the noise, abnormality determined by the abnormality determination unit is ultimately considered as abnormality, it is possible to discriminate between determination of abnormality caused by the noise and determination of abnormality not caused by the noise to determine abnormality with higher reliability. Then, since in the above rotating machine abnormality detection device, the noise determination unit executes determination process when determination is made by the abnormality determination unit that abnormality is present, the noise determination unit does not execute the determination process when determination is made by the abnormality determination unit that abnormality is absent, so that the amount of the data process can be reduced accordingly.

According to another aspect, the abovedescribed rotating machine abnormality detection device further includes a storage unit which stores, as a normal frequency spectrum, the frequency spectrum of measurement data measured by the vibration measurement unit, when the abnormality determination unit determines that abnormality is absent, in which the noise determination unit determines whether the determination of abnormality is caused by noise or not based on a difference between the frequency spectrum obtained by the spectrum processing unit and the normal frequency spectrum stored in the storage unit Preferably, in the above-described rotating machine abnormality detection device, the vibration measurement unit measures the vibration at a predetermined sampling interval set in advance, the spectrum processing unit obtains the frequency spectrum with respect to each measurement data measured by the vibration measurement unit at the predetermined sampling interval, the feature amount processing unit obtains the predetermined feature amount, the abnormality determination unit determines presence/absence of the abnormality, and when latest determination is made that the abnormality is absent by the abnormality determination unit, the storage unit stores (updates and stores), as a normal frequency spectrum, the frequency spectrum of the measurement data measured by the vibration measurement unit.

Since according to such a rotating machine abnormality detection device, determination whether the abnormality is caused by noise or not is made based on a normal frequency spectrum, it is possible to exactly capture noise which is generated not all the time but occasionally, so that abnormality can be determined with higher reliability. In particular, by determining whether the determination of abnormality is caused by noise or not based on a latest normal frequency spectrum, even when a normal frequency spectrum changes, it is possible to exactly capture noise which is generated not all the time but occasionally.

According to a further aspect, in the above-described rotating machine abnormality detection device, the noise determination unit determines whether the determination of abnormality is caused by noise or not, based on a subtraction result (a first subtraction result) obtained by subtracting an average value of the difference from a maximum value of the difference. Preferably, in the rotating machine abnormality detection device, the noise determination unit compares the first subtraction result with a threshold value (a first determination threshold value) set in advance, and when the first subtraction result is larger than the first determination threshold value (or when the first subtraction result is the first determination threshold value thb or more), determines that the determination of abnormality is caused by noise, and when the first subtraction result is the first determination threshold value or less (or when the first subtraction result is less than the first determination threshold value), determines that the determination of abnormality is not caused by noise.

Since the above rotating machine abnormality detection device determines whether the determination of abnormality is caused by noise or not, based on the first subtraction result, properties described above with reference to FIG. 6, FIG. 7, FIG. 8A, and FIG. 9 can be used to enable determination abnormality with higher reliability.

Also according to other aspect, in the above-described rotating machine abnormality detection device, the noise determination unit determines whether the determination of abnormality is caused by noise or not, based on a subtraction result (the second subtraction result) obtained by subtracting an intermediate value (median) of the difference from a maximum value of the difference. Preferably in the above-described rotating machine abnormality detection device, the noise determination unit compares the second subtraction result with a threshold value (a second determination threshold value) set in advance, and when the second subtraction result is larger than the second determination threshold value (or when the second subtraction result is the second determination threshold value or more), determines that the determination of abnormality is caused by noise, and when the second subtraction result is the second determination threshold value or less (or when the second subtraction result is less than the second determination threshold value), determines that the determination of abnormality is not caused by noise.

Since the above rotating machine abnormality detection device determines whether the determination of abnormality is caused by noise or not, based on the second subtraction result, properties described above with reference to FIG. 6, FIG. 7, and FIG. 8B can be used to enable determination abnormality with higher reliability.

According to other aspect, in the above-described rotating machine abnormality detection device, when a first number of teeth and a first rotation frequency of the first rotating body are represented as MA[unit] and VA [Hz], respectively, a second number of teeth of the second rotating body is represented as MB [unit], a least common multiple of the first number of teeth MA and the second number of teeth MB is represented as XAB, a basic wave mesh frequency VA/MA obtained by dividing the first rotation frequency VA by the first number of teeth MA is represented as f1 [Hz], and n-th harmonic mesh frequencies (n is an integer of 2 or more) with respect to the basic wave mesh frequency f1 are represented as fn [Hz], the feature amount processing unit obtains, from the frequency spectrum, a basic wave component F1 of the basic wave mesh frequency f1 and n-th harmonic components Fn of the n-th harmonic mesh frequencies fn (n=2 to XAB) up to the least common multiple XAB and obtains the predetermined feature amount based on the obtained basic wave component F1 and n-th harmonic components Fn. Preferably in the above-described rotating machine abnormality detection device, the vibration measurement unit measures at least one of vibration of an audible band and vibration of an ultrasonic band. Preferably in the above-described rotating machine abnormality detection device, the feature amount processing unit obtains a total sum of the obtained basic wave component F1 and n-th harmonic components Fn as the predetermined feature amount Preferably in the above-described rotating machine abnormality detection device, the abnormality determination unit determines presence/absence of abnormality in the rotating machine according to whether or not the feature amount obtained by the feature amount processing unit is a predetermined threshold value set in advance or more.

Since in such a rotating machine abnormality detection device, a frequency VA/MA obtained by dividing the first rotation frequency VA by the first number of teeth MA is represented as the basic wave mesh frequency f1 [Hz] and a least common multiple of the first number of teeth MA and the second number of teeth MB is represented as XAB, and a basic wave component F1 of the basic wave mesh frequency f1 and n-th harmonic components Fn of n-th harmonic mesh frequencies fn (n=2 to XAB) with respect to the basic wave mesh frequency f1 up to the least common multiple XAB are obtained from a frequency spectrum, the frequency components F1 and Fn in the first and second rotating bodies related to all the combinations of contacts can be obtained. Then, the above rotating machine abnormality detection device determines contact/non-contact based on the frequency components F1 and Fn related to all the combinations of contacts, so that abnormality can be determined with higher precision.

According to other aspect, in the above-described rotating machine abnormality detection device, the spectrum processing unit obtains first and second frequency spectra of first and second measurement data measured in first and second periods different from each other, respectively, and the feature amount processing unit obtains the basic wave component F1 and the n-th harmonic components Fn in the first and second periods, respectively, from the first and second frequency spectra, to obtain, as the predetermined feature amount, an amount of change in the obtained basic wave component F1 and n-th harmonic components Fn in each of the first and second periods. Preferably in the above-described rotating machine abnormality detection device, the feature amount processing unit obtains, as the amount of change, a square sum of a difference in components of the obtained basic wave components F1 and n-th harmonic components Fn in each of the first and second periods.

Although before and after a time point where contact occurs as abnormality, an output of the vibration measurement unit relatively largely changes, also in a case of non-contact, when, for example, the running condition of the rotating machine changes, the output of the vibration measurement unit may gradually change in some case. Since the amounts of change in the basic wave component F1 and the n-th harmonic components Fn in each of the first and second periods, in particular, the square sum of differences in the components in the periods represents a periodic change of contact, the amount of change is characterized in becoming relatively large at a time point where contact occurs in a state of non-contact or a time point where a contact state itself changes. Therefore, since the rotating machine abnormality detection device obtains such an amount of change as the predetermined feature amount, a time point where contact occurs in a state of non-contact or a time point where a contact state itself changes can be detected with higher precision. Also even when background noise is relatively high, when trend (tendency) of the background noise has no change, the amount of change thereof will not become large, so that the above rotating machine abnormality detection device enables reduction in over-detection.

According to other aspect, in the above-described rotating machine abnormality detection device, the feature amount processing unit further obtains, from the frequency spectrum, non-harmonic components G of predetermined frequencies g present between adjacent frequencies among the basic wave mesh frequency f1 and the n-th harmonic mesh frequencies fn (n=2 to XAB) up to the least common multiple XAB to obtain the predetermined feature amount based on the obtained basic wave component F1, n-th harmonic components Fn, and non-harmonic components G.

Preferably in the above-described rotating machine abnormality detection device, in view of obtaining a frequency most apart from the basic wave mesh frequency f1 and the n-th harmonic mesh frequencies fn, the non-harmonic component G is a component of a frequency at the center between the adjacent frequencies (Gk=(Fk+Fk+1)/2, k=an integer of 1 to XAB−1). Preferably in the above-described rotating machine abnormality detection device, the feature amount processing unit further obtains, from the frequency spectra, each non-harmonic component Gk (k is an integer in a range from 1 to (XAB−1)) of each predetermined frequency gk at the center between adjacent frequencies among the basic wave mesh frequency f1 and the n-th harmonic mesh frequencies fn (n=2 to XAB) up to the least common multiple XAB, and considers, as the predetermined feature amount, a total sum ratio of component obtained by dividing a total sum of the obtained basic wave component F1 and n-th harmonic components Fn by the obtained total sum of the non-harmonic components Gk.

There is a case where an output of the vibration measurement unit may have single electrical noise or the like superimposed thereon. Since the rotating machine abnormality detection device obtains the predetermined feature amount further in consideration of the non-harmonic components G, effects exerted by superposition of such a single electrical noise or the like onto abnormality detection can be avoided to enable reduction in noise without periodicity.

According to other aspect, the above-described rotating machine abnormality detection device further includes a model information storage unit which stores in advance, as model information, model values of the basic wave component F1 and the n-th harmonic components Fn corresponding to modes of abnormality occurring in the first and second rotating bodies, in which the feature amount processing unit obtains a matching degree indicative of a degree of matching between the obtained basic wave component F1 and n-th harmonic components Fn, and the model information for each mode of abnormality, and obtains, as the predetermined feature amount, a maximum matching degree among the matching degrees obtained for each mode of abnormality.

Since such a rotating machine abnormality detection device obtains, as the predetermined feature amount, a maximum matching degree from among the matching degrees obtained with respect to each mode of the abnormality, electrical pulse noise and noise having a single and relatively large amplitude caused by external impact and, for example, abnormality such as contact can be discriminated to detect abnormality with higher precision.

According to other aspect, in the above-described rotating machine abnormality detection device, the abnormality determination unit determines the presence of abnormality in the rotating machine in the mode of abnormality having the maximum matching degree among the matching degrees obtained for each mode of abnormality by the feature amount processing unit.

Such a rotating machine abnormality detection device can detect a mode of abnormality.

According to other aspect, the above-described rotating machine abnormality detection device further includes a model information storage unit which stores in advance, as model information, model values of the basic wave component F1 and the n-th harmonic components Fn corresponding to modes of abnormality occurring in the first and second rotating bodies, in which the spectrum processing unit obtains first and second frequency spectra of first and second measurement data measured in first and second periods different from each other, respectively; and the feature amount processing unit conducts a plurality of processes among followings: a total sum calculation process for obtaining a total sum of the obtained basic wave component F1 and n-th harmonic components Fn; an amount of change calculation process for obtaining the basic wave components F1 and the n-th harmonic components Fn in the first and second periods, respectively, from both the first and second frequency spectra, and then obtaining an amount of change of the obtained basic wave components F1 and n-th harmonic components Fn in each of the first and second periods; a total sum ratio of component calculation process for further obtaining, from the frequency spectrum, non-harmonic components Gi (i: integer from 1 to (n−1)) of predetermined frequencies gi present between adjacent frequencies among the basic wave mesh frequency f1 and the n-th harmonic mesh frequencies fn (n=2 to XAB) up to the least common multiple XAB, and then obtaining a total sum ratio of component by dividing a total sum of the obtained basic wave component F1 and n-th harmonic components Fn by a total sum of the obtained non-harmonic components Gi; and a maximum matching degree calculation process for obtaining a matching degree indicative of a degree of matching between the obtained basic wave component F1 and n-th harmonic components Fn, and the model information for each mode of abnormality, and then obtaining a maximum matching degree among the matching degrees obtained for each mode of abnormality, and obtains the predetermined feature amount based on process results of the plurality of processes conducted.

Since such a rotating machine abnormality detection device obtains the predetermined feature amount based on process results of the plurality of processes conducted, abnormality can be detected with higher precision.

According to other aspect, in the above-described rotating machine abnormality detection devices, the spectrum processing unit includes a high pass filter which eliminates noise, and a sub-spectrum processing unit which obtains a frequency spectrum of measurement data, the measurement data being measured by the vibration measurement unit and having passed through the high pass filter.

Since such a rotating machine abnormality detection device includes the high-pass filter, background noise distributed in a relatively low frequency band can be removed. Accordingly, the above rotating machine abnormality detection device can detect abnormality with higher precision.

According to other aspect, the rotating machine abnormality detection method for detecting abnormality in a rotating machine having a first rotating body and a second rotating body which rotate around respective predetermined shaft while engaging with each other with a predetermined gap provided therebetween in a normal state, the method including a vibration measuring step for measuring vibration caused by at least one of the first and second rotating bodies; a spectrum process step for obtaining a frequency spectrum of measurement data measured in the vibration measuring step; a feature amount process step for obtaining a predetermined feature amount related to a predetermined frequency component, based on the frequency spectrum obtained in the spectrum process step; an abnormality determination step for determining presence/absence of abnormality in the rotating machine, based on the predetermined feature amount obtained in the feature amount process step, and a noise determination step for determining presence/absence of noise superimposing on the measurement data measured in the vibration measuring step, based on the frequency spectrum obtained in the spectrum process step, in which the noise determination step is conducted when determination is made in the abnormality determination step that abnormality is present, and when determination is made in the noise determination step that the noise is absent, the determined abnormality is ultimately considered as abnormality in the abnormality determination step.

Since in such a rotating machine abnormality detection method, when the determination is made in the noise determination step that no noise is present, abnormality determined in the abnormality determination step is ultimately considered as abnormality, it is possible to discriminate between determination of abnormality based on measurement data including the noise and determination of abnormality based on measurement data not including the noise to determine abnormality with higher reliability. Then, the above rotating machine abnormality detection method executes the noise determination step when determination is made in the abnormality determination step that abnormality is present, and does not execute the noise determination step when determination is made in the abnormality determination step that abnormality is absent, so that the amount of the data process can be reduced accordingly.

According to other aspect, the rotating machine includes the rotating machine abnormality detection device according to any one of the foregoing aspects.

The rotating machine including the rotating machine abnormality detection device according to any one of the foregoing aspects can be presented, and provision of the rotating machine abnormality detection device according to any one of the foregoing aspects in such a rotating machine enables abnormality to be determined with higher reliability.

The present application claims priority from Japanese Patent Application No. 2016-197684 filed on Oct. 6, 2016, disclosure of which is all incorporated herein.

Although the present invention has been appropriately and fully described with respect to the embodiments with reference to the drawings in the foregoing for explaining the present invention, it should be understood that those skilled in the art can easily make change and/or modification in the above-described embodiments. Accordingly, it is construed that unless changes or modifications made by those skilled in the art depart from the rights covered by the claims recited in the scope of claims, the changes or the modifications are included in the scope of claims.

INDUSTRIAL APPLICABILITY

According to the present invention, a rotating machine abnormality detection device, a rotating machine abnormality detection method, and a rotating machine including the rotating machine abnormality detection device can be provided.

The invention claimed is:

1. A rotating machine abnormality detection device to detect abnormality in a rotating machine having at least a first rotating body and a second rotating body which rotate around respective predetermined shafts while engaging with each other with a predetermined gap provided therebetween in a normal state, the device comprising:
a central processing unit (CPU);
a sensor, to measure vibration caused by at least one of the first and second rotating bodies;
a spectrum processing unit, to be executed by the CPU, to obtain a frequency spectrum of measurement data measured by the sensor;
a feature amount processing unit, to be executed by the CPU, to obtain a predetermined feature amount related to a predetermined frequency component, based on the frequency spectrum obtained by the spectrum processing unit;

an abnormality determination unit, to be executed by the CPU, to determine presence/absence of an abnormality in the rotating machine, based on the predetermined feature amount obtained by the feature amount processing unit;

a memory to store, as a normal frequency spectrum, the frequency spectrum of measurement data measured by the sensor that indicates that abnormality is absent; and a noise determination unit, to be executed by the CPU, to determine, when determination is made that abnormality is present by the abnormality determination unit and based on differences between the frequency spectrum obtained by the spectrum processing unit and the normal frequency spectrum stored in the memory, whether the determination of abnormality is caused by noise or not, wherein when the noise determination unit determines that the determination of abnormality is not caused by the noise, the abnormality determination unit is to confirm the determined abnormality as a confirmed abnormality, and the noise determination unit is to determine whether the determination of abnormality is caused by noise or not, based on a subtraction result obtained by subtracting one of an average value and a median value of the differences between the frequency spectrum obtained by the spectrum processing unit and the normal frequency spectrum stored in the memory from a maximum value of the differences.

2. The rotating machine abnormality detection device according to claim 1, wherein the spectrum processing unit includes a high pass filter to eliminate noise, and a sub-spectrum processing unit to obtain a frequency spectrum of measurement data, the measurement data being measured by the sensor and having passed through the high pass filter.

3. A rotating machine comprising the rotating machine abnormality detection device according to claim 1.

4. A rotating machine abnormality detection device to detect abnormality in a rotating machine having at least a first rotating body and a second rotating body which rotate around respective predetermined shafts while engaging with each other with a predetermined gap provided therebetween in a normal state, the device comprising:

a central processing unit (CPU);

a sensor to measure vibration caused by at least one of the first and second rotating bodies;

a spectrum processing unit, to be executed by the CPU, to obtain a frequency spectrum of measurement data measured by the sensor;

a feature amount processing unit, to be executed by the CPU, to obtain a predetermined feature amount related to a predetermined frequency component, based on the frequency spectrum obtained by the spectrum processing unit;

an abnormality determination unit, to be executed by the CPU, to determine presence/absence of an abnormality in the rotating machine, based on the predetermined feature amount obtained by the feature amount processing unit; and a noise determination unit, to be executed by the CPU, to determine, when determination is made that abnormality is present by the abnormality determination unit and based on the frequency spectrum obtained by the spectrum process unit, whether the determination of abnormality is caused by noise or not, wherein when the noise determination unit determines that the determination of abnormality is not caused by the noise, the abnormality determination unit is to confirm the determined abnormality as a confirmed abnormality, when a first number of teeth and a first rotation frequency of the first rotating body are represented as MA [unit] and VA [Hz], respectively, a second number of teeth of the second rotating body is represented as MB [unit], a least common multiple of the first number of teeth MA and the second number of teeth MB is represented as XAB, a basic wave mesh frequency VA/MA obtained by dividing the first rotation frequency VA by the first number of teeth MA is represented as f1 [Hz], and n-th harmonic mesh frequencies (n is an integer of 2 or more) with respect to the basic wave mesh frequency f1 are represented as fn [Hz], the feature amount processing unit obtains, from the frequency spectrum, a basic wave component F1 of the basic wave mesh frequency f1 and n-th harmonic components Fn of the n-th harmonic mesh frequencies fn (n=2 to XAB) up to the least common multiple XAB, and obtains the predetermined feature amount based on the obtained basic wave component F1 and n-th harmonic components Fn.

5. The rotating machine abnormality detection device according to claim 4, wherein the spectrum processing unit is to obtain first and second frequency spectra of first and second measurement data measured in first and second periods different from each other, respectively, and the feature amount processing unit is to obtain the basic wave component F1 and the n-th harmonic components Fn in the first and second periods, respectively, from the first and second frequency spectra, to obtain, as the predetermined feature amount, an amount of change in the obtained basic wave component F1 and n-th harmonic components Fn in each of the first and second periods.

6. The rotating machine abnormality detection device according to claim 5, wherein the feature amount processing unit is to obtain, as the amount of change, a square sum of a difference in components of the obtained basic wave components F1 and n-th harmonic components Fn in each of the first and second periods.

7. The rotating machine abnormality detection device according to claim 4, wherein the feature amount processing unit is to further obtain, from the frequency spectrum, non-harmonic components G of predetermined frequencies g present between adjacent frequencies among the basic wave mesh frequency f1 and the n-th harmonic mesh frequencies fn (n=2 to XAB) up to the least common multiple XAB to obtain the predetermined feature amount based on the obtained basic wave component F1, n-th harmonic components Fn, and non-harmonic components G.

8. The rotating machine abnormality detection device according to claim 4, further comprising a model information memory to store in advance, as model information, model values of the basic wave component F1 and the n-th harmonic components Fn corresponding to modes of abnormality occurring in the first and second rotating bodies, wherein the feature amount processing unit obtains a matching degree indicative of a degree of matching between the obtained basic wave component F1 and n-th harmonic components Fn, and the model information for each mode of abnormality, and obtains, as the predetermined feature amount, a maximum matching degree among the matching degrees obtained for each mode of abnormality.

9. The rotating machine abnormality detection device according to claim 8, wherein the abnormality determination unit is to determine the presence of abnormality in the rotating machine in the mode of abnormality having the maximum matching degree among the matching degrees obtained for each mode of abnormality by the feature amount processing unit.

10. The rotating machine abnormality detection device according to claim 4, further comprising a model information memory to store in advance, as model information, model values of the basic wave component F1 and the n-th harmonic components Fn corresponding to modes of abnormality occurring in the first and second rotating bodies, wherein:

the spectrum processing unit is to obtain first and second frequency spectra of first and second measurement data measured in first and second periods different from each other, respectively; and the feature amount processing unit is to conduct at least one of:

a total sum calculation process for obtaining a total sum of the obtained basic wave component F1 and n-th harmonic components Fn;

an amount of change calculation process for obtaining the basic wave components F1 and the n-th harmonic components Fn in the first and second periods, respectively, from both the first and second frequency spectra, and then obtaining an amount of change of the obtained basic wave components F1 and n-th harmonic components Fn in each of the first and second periods;

a total sum ratio of component calculation process for further obtaining, from the frequency spectrum, non-harmonic components Gi (i: integer from 1 to (n−1)) of predetermined frequencies gi present between adjacent frequencies among the basic wave mesh frequency f1 and the n-th harmonic mesh frequencies fn (n=2 to XAB) up to the least common multiple XAB, and then obtaining a total sum ratio of component by dividing a total sum of the obtained basic wave component F1 and n-th harmonic components Fn by a total sum of the obtained non-harmonic components Gi; and a maximum matching degree calculation process for obtaining a matching degree indicative of a degree of matching between the obtained basic wave component F1 and n-th harmonic components Fn, and the model information for each mode of abnormality, and then obtaining a maximum matching degree among the matching degrees obtained for each mode of abnormality, and obtain the predetermined feature amount based on process results of the plurality of processes conducted.

11. A rotating machine comprising the rotating machine abnormality detection device according to claim 4.

12. A rotating machine abnormality detection method for detecting abnormality in a rotating machine having a first rotating body and a second rotating body which rotate around respective predetermined shaft while engaging with each other with a predetermined gap provided therebetween in a normal state, the method comprising:

a vibration measuring step for measuring vibration caused by at least one of the first and second rotating bodies;

a spectrum process step for obtaining a frequency spectrum of measurement data measured in the vibration measuring step;

a feature amount process step for obtaining a predetermined feature amount related to a predetermined frequency component, based on the frequency spectrum obtained in the spectrum process step;

an abnormality determination step for determining presence/absence of abnormality in the rotating machine, based on the predetermined feature amount obtained in the feature amount process step;

a storage step for storing in a memory, as a normal frequency spectrum, the frequency spectrum of measurement data measured by a sensor that indicates that abnormality is absent, and a noise determination step for determining presence/absence of noise superimposing on the measurement data measured in the vibration measuring step, when determination is made in the abnormality determination step that abnormality is present and based on differences between the frequency spectrum obtained in the spectrum process step and the normal frequency spectrum stored in the memory, wherein when determination is made in the noise determination step that the noise is absent, the determined abnormality is confirmed as a confirmed abnormality in the abnormality determination step, and determination as to whether the determination of abnormality is caused by noise or not is made in the noise determination step, based on a subtraction result obtained by subtracting one of an average value and a median value of the differences between the frequency spectrum obtained by the spectrum processing unit and the normal frequency spectrum stored in the memory from a maximum value of the differences.

* * * * *